US012777123B2

(12) United States Patent
Shimizu et al.

(10) Patent No.: US 12,777,123 B2
(45) Date of Patent: Oct. 27, 2026

(54) SYSTEM FOR SETTING IMAGE FORMING CONDITION TO BE USED IN IMAGE FORMING APPARATUS

(71) Applicant: CANON KABUSHIKI KAISHA, Tokyo (JP)

(72) Inventors: Kazumichi Shimizu, Chiba (JP); Shimpei Ishikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 213 days.

(21) Appl. No.: 18/828,421

(22) Filed: Sep. 9, 2024

(65) Prior Publication Data

US 2025/0097359 A1 Mar. 20, 2025

(30) Foreign Application Priority Data

Sep. 20, 2023 (JP) ................................ 2023-153905
May 27, 2024 (JP) ................................ 2024-085657

(51) Int. Cl.
*H04N 1/00* (2006.01)

(52) U.S. Cl.
CPC ..... *H04N 1/00602* (2013.01); *H04N 1/00694* (2013.01); *H04N 1/00724* (2013.01)

(58) Field of Classification Search
None
See application file for complete search history.

(56) References Cited

U.S. PATENT DOCUMENTS

2023/0221910 A1* 7/2023 Morales ................ G06F 3/1203 358/1.9
2025/0306824 A1* 10/2025 Suzuki .................. G06F 3/1288

FOREIGN PATENT DOCUMENTS

JP 2003091110 A * 3/2003
JP 2023071171 A * 5/2023 ........... G06F 3/1292

* cited by examiner

*Primary Examiner* — Twyler L Haskins
(74) *Attorney, Agent, or Firm* — ROSSI, KIMMS & McDOWELL LLP

(57) ABSTRACT

An image forming apparatus selects a first image forming condition according to a type of a sheet, and transmits a request signal. A server apparatus receives the request signal, determines whether the type is a particular type which is a type of a sheet delivered from a service provider to a user through a subscription contract, generates and transmits a response signal for a second image forming condition prepared in advance for the particular type when it is determined that the type is the particular type. The image forming apparatus forms an image on the sheet according to the first image forming condition or the second image forming condition based on the response signal.

26 Claims, 20 Drawing Sheets

FIG. 6

551

| USER ID | TYPE INFORMATION |
| --- | --- |
| • • • | • • • |
| U01 | PA<br>PB |

552

| TYPE INFORMATION | THROUGHPUT | • • • | FIXING TEMPERATURE |
| --- | --- | --- | --- |
| PA | 32ppm | • • • | 180°C |
| PB | 16ppm | • • • | 170°C |
| • • • | • • • | • • • | • • • |
| A4(PLAIN PAPER) | 30ppm | • • • | 185°C |
| A5(PLAIN PAPER) | 15ppm | • • • | 175°C |
| • • • | • • • | • • • | • • • |

FIG. 12

551

| USER ID | TYPE INFORMATION | NUMBER OF REMAINING SUBSCRIPTION SHEETS |
|---|---|---|
| U01 | PA | 10000 |
| U01 | PB | 50000 |

552

| TYPE INFORMATION | THROUGHPUT | • • • | FIXING TEMPERATURE |
|---|---|---|---|
| PA | 32ppm | • • • | 180℃ |
| PB | 16ppm | • • • | 170℃ |
| • • • | • • • | • • • | • • • |
| A4(PLAIN PAPER) | 30ppm | • • • | 185℃ |
| A5(PLAIN PAPER) | 15ppm | • • • | 175℃ |

SYSTEM FOR SETTING IMAGE FORMING CONDITION TO BE USED IN IMAGE FORMING APPARATUS

BACKGROUND OF THE INVENTION

Field of the Invention

The present invention relates to a system for setting an image forming condition to be used in an image forming apparatus.

Description of the Related Art

Control parameters appropriate for an image forming apparatus may vary depending on roughness and transparency of a surface of a sheet. According to Japanese Patent Laid-Open No. 2003-091110, an image forming apparatus has been proposed which optically detects roughness, transparency, and edge shadows of a sheet surface and controls a conveying speed, a fixing temperature, and a transfer condition according to a detection result.

Various types of sheets are widely used in a market. Different manufacturers provide sheets each of which is called plain paper; however characteristics of the sheets are different. Therefore, it is difficult to set appropriate control parameters for all types of sheets on the market. On the other hand, if the same manufacturer provides a sheet and an image forming apparatus, the characteristics of the sheet are known and therefore more appropriate control parameters will be provided. In particular, according to subscription services for consumables, which have become widespread in recent years, toner and sheets are delivered on a regular interval or as needed. In such services, the type of the sheet can be clearly determined and the corresponding control parameters can be prepared in advance.

SUMMARY OF THE INVENTION

The present disclosure provides an image forming system comprising: an image forming apparatus configured to form an image on a sheet; and a server apparatus configured to connect to the image forming apparatus via a network, wherein the image forming apparatus comprises: a first processor configured to: select a first image forming condition according to a type of the sheet; transmit a request signal including type information indicating the type of the sheet to the server apparatus; and receive a response signal corresponding to the request signal; and an image forming unit configured to form the image on the sheet, and wherein the server apparatus comprises a second processor configured to: receive the request signal from the image forming apparatus; determine whether the type of the sheet based on the request signal is the same as a particular type which is a type of a sheet delivered from a service provider to a user through a subscription contract; and in a case where the type of the sheet based on the request signal is the same as the particular type, generate the response signal specifying to perform image formation with a second image forming condition prepared in advance for the particular type, and transmit the response signal to image forming apparatus, and wherein the image forming unit is further configured to form the image on the sheet according to the first image forming condition or the second image forming condition based on the response signal.

Further features of the present invention will become apparent from the following description of exemplary embodiments (with reference to the attached drawings).

BRIEF DESCRIPTION OF THE DRAWINGS

FIG. 6 is illustration of a management database (DB).

FIG. 12 is a diagram illustrating a management database (DB) according to a third embodiment.

DESCRIPTION OF THE EMBODIMENTS

Figure 1:
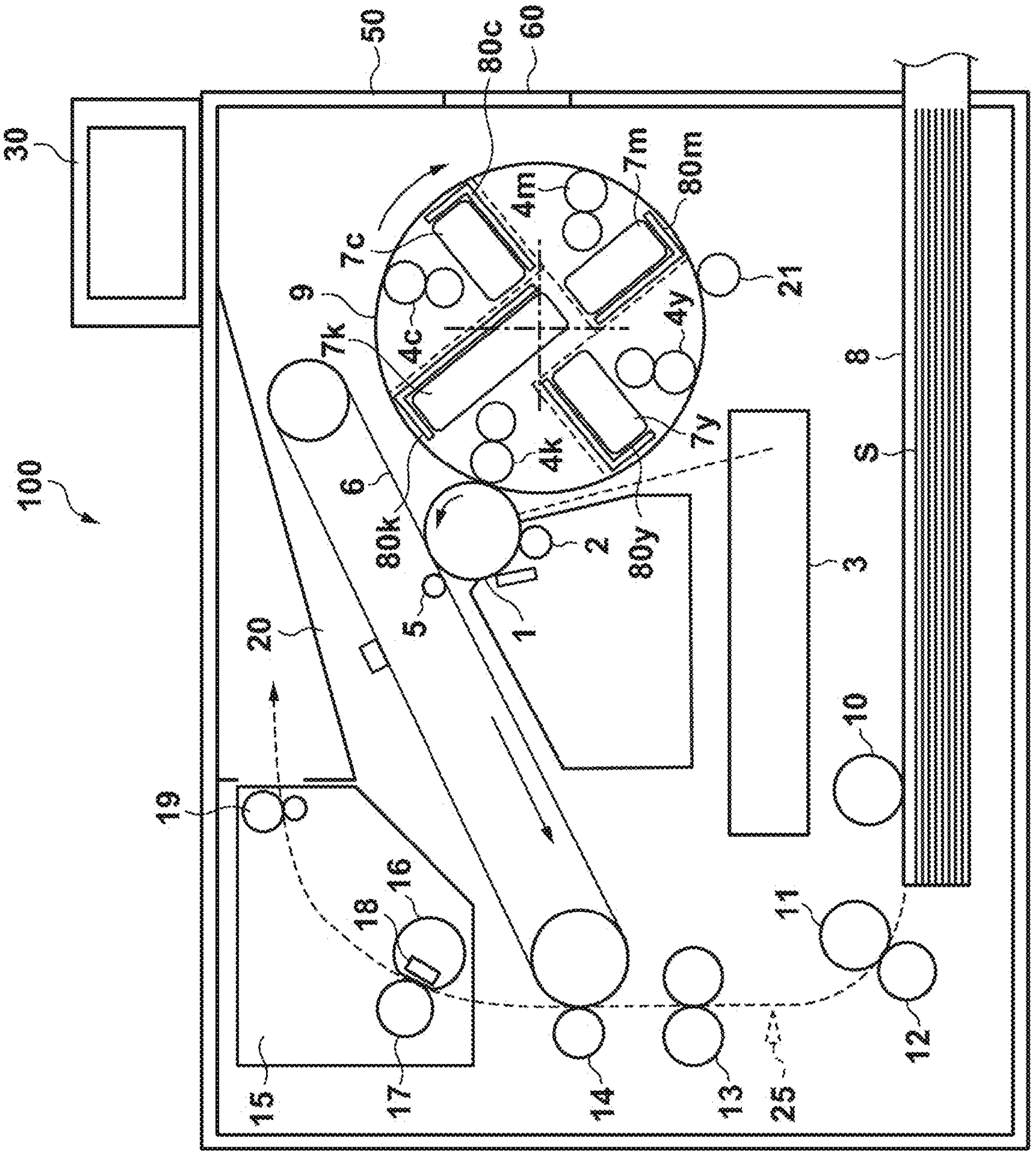
FIG. 1 is a schematic diagram of an image forming apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Embodiment 1

The embodiment is applicable to an image forming apparatus such as a copier, a printer, a facsimile receiver, and a multifunctional peripheral. The image forming apparatus in the embodiment is a color laser printer, but it may also be a monochrome laser printer, an inkjet printer, or other printers employing different image forming methods.

1. Image Forming Apparatus

FIG. 1 shows an image forming apparatus 100. An image forming apparatus 100 is a rotary-type full-color laser beam printer, but may also be a tandem-type laser beam printer. A photosensitive drum 1 is an image carrier that rotates in a counter-clockwise direction while carrying an electrostatic latent image or a toner image. A charging roller 2 uniformly charges the surface of the photosensitive drum 1 using a predetermined charging voltage. An exposure device 3 irradiates the surface of the photosensitive drum 1 with a laser beam corresponding to an image signal to form an electrostatic latent image. A rotary main body 9 has toner cartridges 7*y*, 7*m*, 7*c*, and 7*k*, and developing rollers 4*y*, 4*m*, 4*c*, and 4*k*, and is rotated by 90 degrees in a clockwise direction by a drive gear 21. The toner cartridges 7*y*, 7*m*, 7*c*, and 7*k* hold yellow toner, magenta toner, cyan toner, and black toner, respectively. As described above, y, m, c, and k assigned to the end of the reference numeral mean yellow, magenta, cyan, and black, respectively. When matters common to the four colors are described, the letters y, m, c, and k are omitted from the reference numerals. When the rotary main body 9 rotates, the developing roller 4 facing photosensitive drum 1 is switched. In FIG. 1, the developing roller 4*k* and photosensitive drum 1 face each other, and electrostatic latent image is developed using the black toner to form a black toner image. As the photosensitive drum 1 further rotates, the toner images are conveyed to a primary transfer nip where the photosensitive drum 1 and the primary transfer roller 5 face each other. A predetermined developing voltage is applied to the developing roller 4*k*. The primary transfer roller 5 transfers the toner images from the photosensitive drum 1 to an intermediate transfer body 6 using a predetermined primary transfer voltage. The yellow image, the magenta image, the cyan image, and the black toner image are sequentially transferred to the intermediate transfer body 6. As a result, full-color images are formed on the intermediate transfer body 6. The intermediate transfer body 6 is, for example, an endless belt (intermediate transfer belt) that rotates in a clockwise direction. When intermediate transfer body 6 rotates, the toner images are conveyed to secondary transfer nip. The secondary transfer nip is formed by abutting the intermediate transfer body 6 and the secondary transfer roller 14.

The sheet cassette 8 is a stacking table, a storage cabinet, or a storage table which stores sheets S or on which sheets S are stacked. A pickup roller 10 picks up the sheet S stored in the sheet cassette 8 and conveys the sheet S to a downstream side. Here, "downstream" means downstream in a conveying direction of the sheet S from the sheet cassette 8 toward a discharge tray 20. A feed roller 11 conveys the sheet S further downstream side. The separation roller 12 rotates to return to the sheet cassette 8 the remaining sheets S other than the uppermost sheet S among the plurality of sheets S carried out from the sheet cassette 8. As a result, one sheet S is conveyed to a secondary transfer nip. Registration rollers 13 are rollers that correct skew of the sheet S or adjust a timing at which the sheet S arrives at the secondary transfer nip. A secondary transfer roller 14 transfers the toner images from the intermediate transfer body 6 to the sheet S using a predetermined secondary transfer voltage.

A fixing device 15 is provided downstream of the secondary transfer nip. The fixing device 15 includes a fixing film 16, a heater 18 that heats the fixing film 16, and a pressure roller 17 that is pressed toward the fixing film 16. The heater 18 heats the fixing film 16 so that the temperature (fixing temperature) of the fixing film 16 becomes a predetermined target temperature. While the sheet S is passing through a fixing nip formed by the fixing film 16 and the pressure roller 17, the toner image and the sheet S are supplied with heat and pressure.

As a result, the toner image is fixed on the sheet S. A discharge roller 19 discharges the sheet S to a discharge tray 20.

A user of the image forming apparatus 100 may subscribe a contract for a subscription service. The subscription service is a service in which consumables are automatically delivered to a user when consumables (e.g. toner and sheet S) of the image forming apparatus 100 are reduced. The user can receive appropriate consumables at an appropriate timing. Therefore, the user is less likely to encounter an event such as running out of consumables and not being able to form images. The user can place the sheet S prepared by himself or herself on the sheet cassette 8 and form an image on the sheet S. A medium sensor 25 is an option and detects a type of the sheet S supplied from the sheet cassette 8. Thereby, whether the type of the sheet S is a type prepared independently by the user or a particular type delivered from a service provider to the user by a subscription contract may be specified. Alternatively, type information indicating the type of the sheet S may be input by the user from an operation unit 30. That is, the operation unit 30 may work as an accepting unit that accepts an input operation on the type information. The type is specified from, for example, a size and a material. The material include, for example, paper such as plain paper and cardboard, a sheet material subjected to surface coating such as plastic film, cloth, and coated paper, and a sheet material having a special shape such as an envelope or indexed paper.

The toner cartridge 7*y*, 7*m*, 7*c*, and 7*k* are mounted on a movable cartridge trays 80*y*, 80*m*, 80*c*, 80*k*, respectively. A cartridge door 60 is provided on a front side of a housing 50. When the cartridge tray 80 moves through the cartridge door 60, the toner cartridge 7 is exposed to the outside of the housing 50.

Figure 2A:
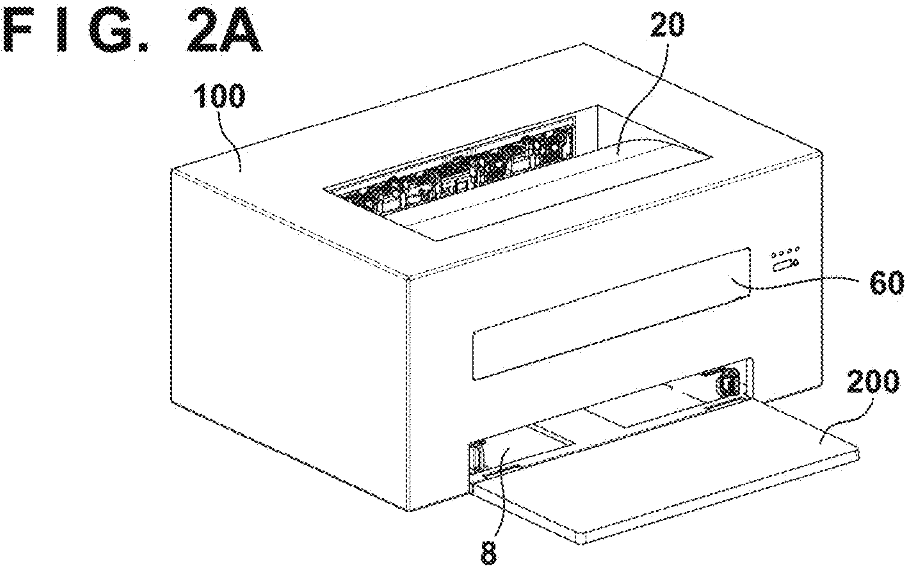
FIGS. 2A, 2B and 2C are illustration of how to replace a toner cartridge.
Figure 2B:
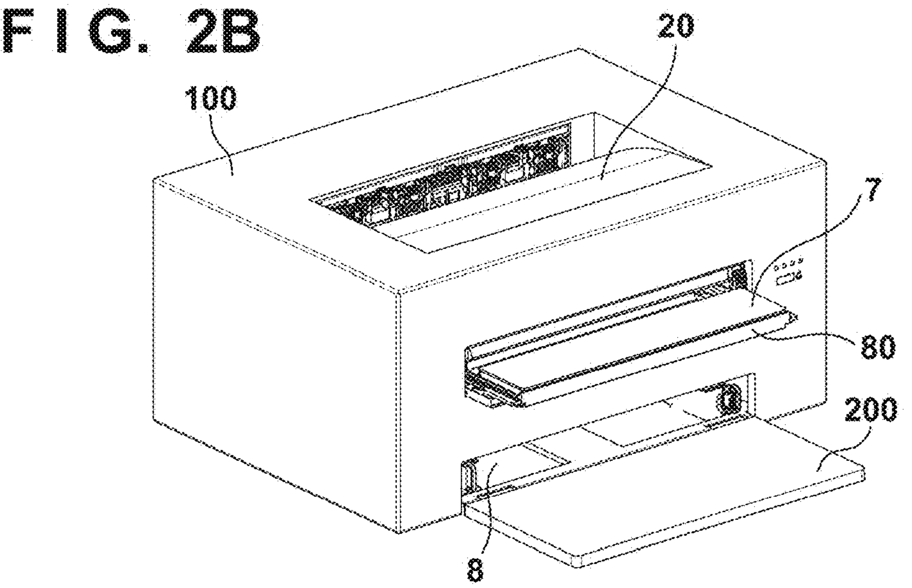
Figure 2C:
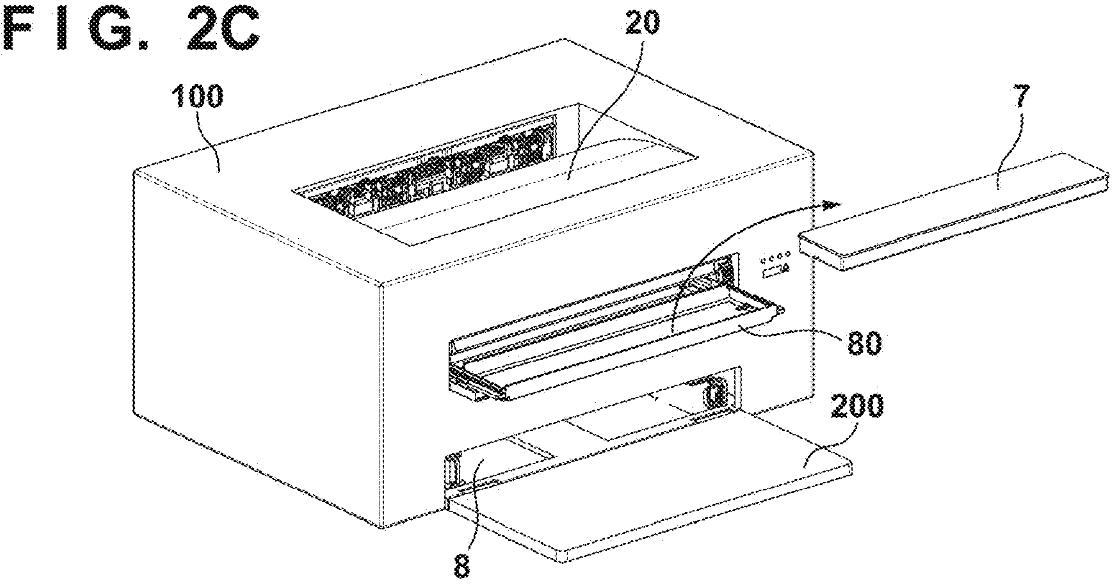

FIGS. 2A to 2C show how to replace the toner cartridge 7. According to FIG. 2A, the sheet table 200, which also works as a cover of the sheet cassette 8, is opened. The cartridge door 60 is closed.

When the replacement of the toner cartridge 7 is instructed through the operating unit 30, as shown in FIG. 2B, the cartridge door 60 opens and the cartridge tray 80 moves from the inside toward the outside. As a result, the toner cartridge 7 is also exposed to the outside. The user removes the toner cartridge 7 with no toner from the cartridge tray 80. Then, a new toner cartridge 7 is delivered from the service provider to the user according to the subscription contract, and the user attaches the new toner cartridge 7 to the cartridge tray 80. The cartridge tray 80 is mounted to the rotary body 9 manually or by a motor. The cartridge door 60 closes as the cartridge tray 80 moves into an interior of the image forming apparatus 100.

2. Image Forming Apparatus Control Unit

Figure 3:
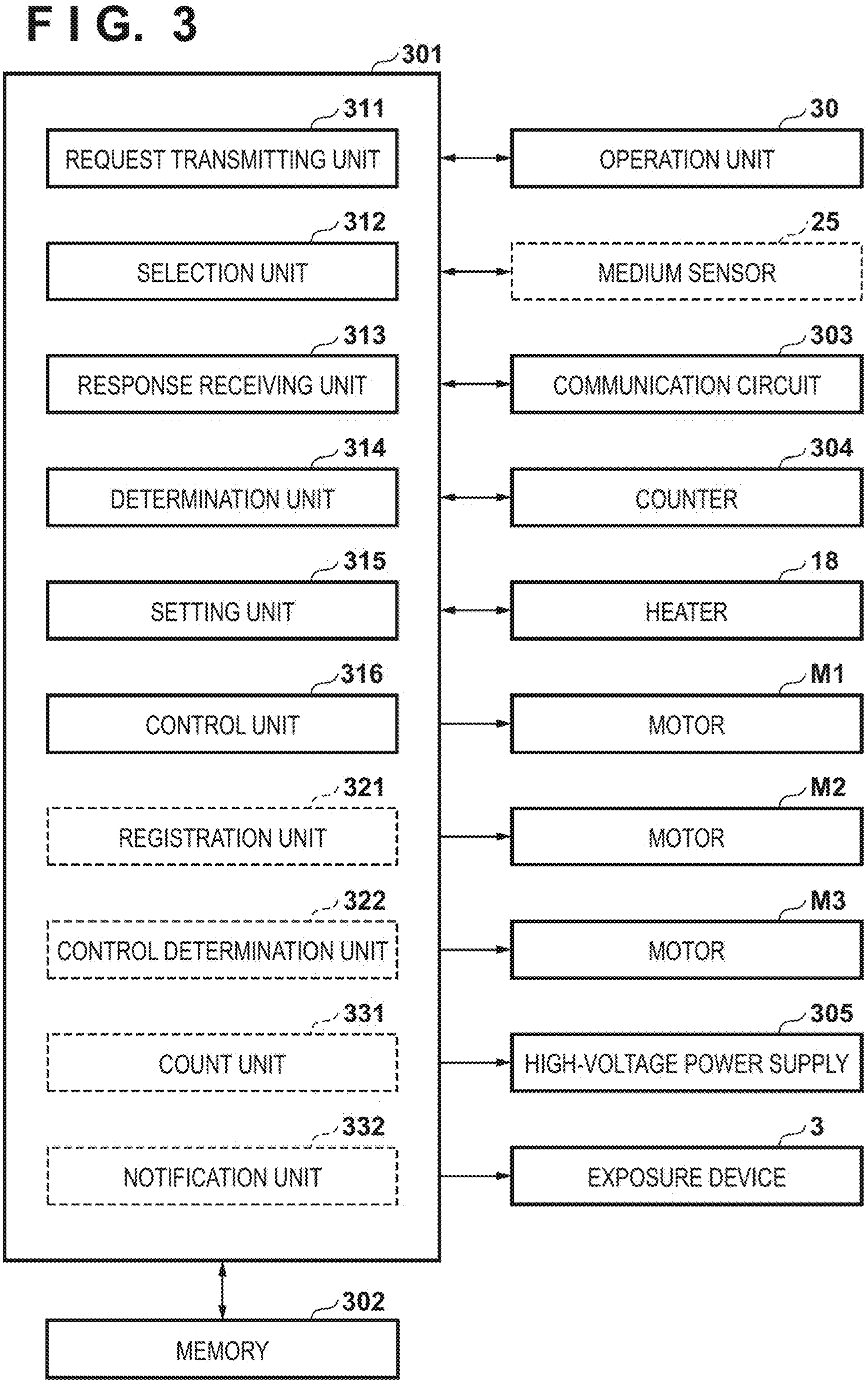
FIG. 3 is a diagram illustrating a controller of an image forming apparatus.

FIG. 3 shows a central processing unit (CPU) 301 and the like constituting a control unit of the image forming apparatus 100. The CPU 301 controls the image forming apparatus 100 by executing a control program stored in a ROM area of the memory 302. The memory 302 may include a semiconductor storage device such as a read-only memory (ROM), a random access memory (RAM), and a solid-state drive (SSD), and a hard disk drive (HDD).

The operation unit 30 includes a display device (e.g. a liquid crystal display) that displays information to the user, and an input device (e.g. a touch sensor) that is operated by the user and inputs information to the CPU 301. A communication circuit 303 is a communication circuit that communicates with a computer such as a server apparatus or a user terminal. A counter 304 counts a consumption amount (the number of sheets) of the sheet S delivered from the service provider to the user according to the subscription contract. The CPU 301 controls the heaters 18, the motors M1 to M3, a high-voltage power supply 305, the exposure device 3, and the like by using control information (e.g. an image forming condition) corresponding to the type of the sheet S. The motor M1 rotates the rotary body 9. The motor M2 moves the cartridge tray 80. The motor M3 drives the feed roller 11, the secondary transfer roller 14, and the like.

The high-voltage power supply 305 generates the charging voltage, the developing voltage, the primary transfer voltage, and the secondary transfer voltage. The CPU 301 adjusts an electric power supplied to the heater 18 so that a temperature (fixing temperature) of the heater 18 becomes a target temperature.

The target temperature is one of an image forming condition corresponding to the type of the sheet S. A conveyance speed of the secondary transfer roller 14 and the like are also one of the image forming conditions corresponding to the type of the sheet S. The charging voltage, the developing voltage, the primary transfer voltage, the secondary transfer voltage, and the like are also the image forming conditions according to the type of the sheet S.

There are several functions realized by the CPU 301 executing a control program. A request transmitting unit 311 generates a request signal (request) for the server apparatus 401 illustrated in FIG. 4, and transmits the request signal to the server apparatus 401 through the communication circuit 303. A selection unit 312 selects an image forming condition for image formation according to the type of the sheet S stored or stacked in the sheet cassette 8. A response receiving unit 313 receives a response signal (response) from the server apparatus 401 through the communication circuit 303. A determination unit 314 executes a determination process, which will be described later, based on the response signal. The determining process includes, for example, determining whether the image forming apparatus 100 should use a determined image forming condition determined by the image forming apparatus 100 or an image forming condition provided by the server apparatus 401. A setting unit 315 sets the image forming condition in a control unit 316. The control unit 316 controls the heaters 18, the motors M1 to M3, the high-voltage power supply 305, the exposure device 3, and the like, and performs image formation.

A registering unit 321 is used in the second embodiment, and stores contract information transmitted from the server apparatus 401 in the memory 302. A control determination unit 322 determines image forming condition based on the contract information stored in the memory 302.

A counting unit 331, which is used in the third embodiment, counts the number of sheets on which an image is formed using the counter 304. A notification unit 332 notifies the server apparatus 401 of the counted value of the counter 304.

3. Image Forming System (Management System)

Figure 4:
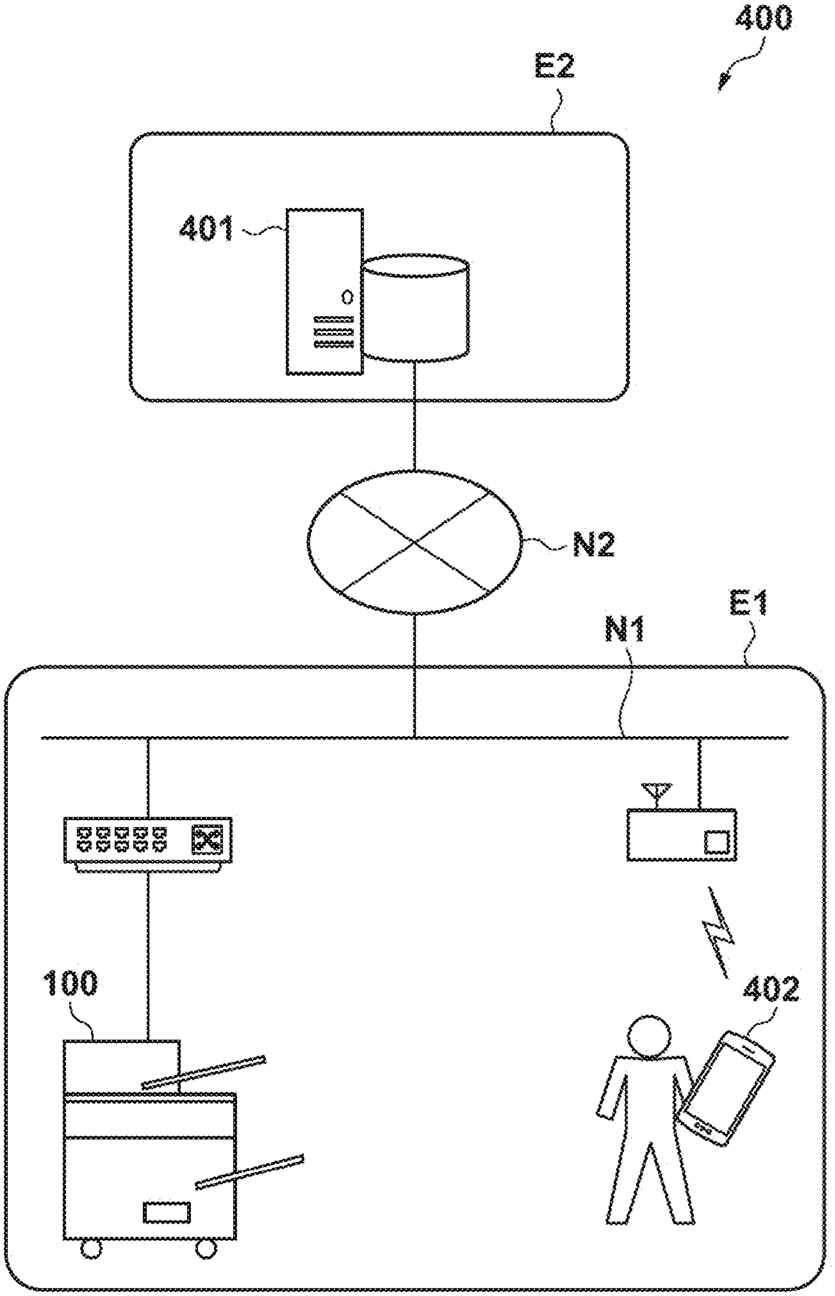
FIG. 4 is a diagram illustrating an image forming system (sheet management system).

FIG. 4 illustrates an exemplary image forming system 400. The image forming system 400 includes the image forming apparatus 100 and the server apparatus 401.

The image forming apparatus 100 is installed in a user environment E1 in which the user exists. The image forming apparatus 100 is connected to a local network N1, which may be, for example, a local area network (LAN). The server apparatus 401 is installed in a remote environment E2. The remote environment E2 is connected to the local network N1 via an external network N2. The external network N2 may be, for example, the Internet or a virtual private network (VPN). Each of the local network N1 and the external network N2 may include any type and any number of network node, such as, for example, routers, switches, gateways, radio access points, and base stations.

In the user environment E1, the user utilizes the image forming apparatus 100. The image forming apparatus 100 prints images on the sheet S as described above.

The server apparatus 401 centrally manages a contract status of individual sheets S by a plurality of users. The server apparatus 401 may be implemented as an application server, a database server, or a cloud server using, for example, a high-performance general-purpose computer. A user terminal 402 is a terminal device that provides a user interface for supporting a process cartridge management function of the server apparatus 401 to the user. The user terminal 402 may be, for example, a general-purpose radio communication terminal device such as a smart phone, a mobile phone, a personal computer (PC), or a personal digital assistant (PDA). The image forming apparatus 100 may also provide user interfaces to the user through the operating unit 30.

The functions of the server apparatus 401 may be provided by a single computer, or may be provided by a plurality of physically separated computers cooperating with each other. A part of databases described as being held by the server apparatus 401 may be held by a computer (e.g. another database server) separate from the server apparatus 401.

4. Server Apparatus

Figure 5:
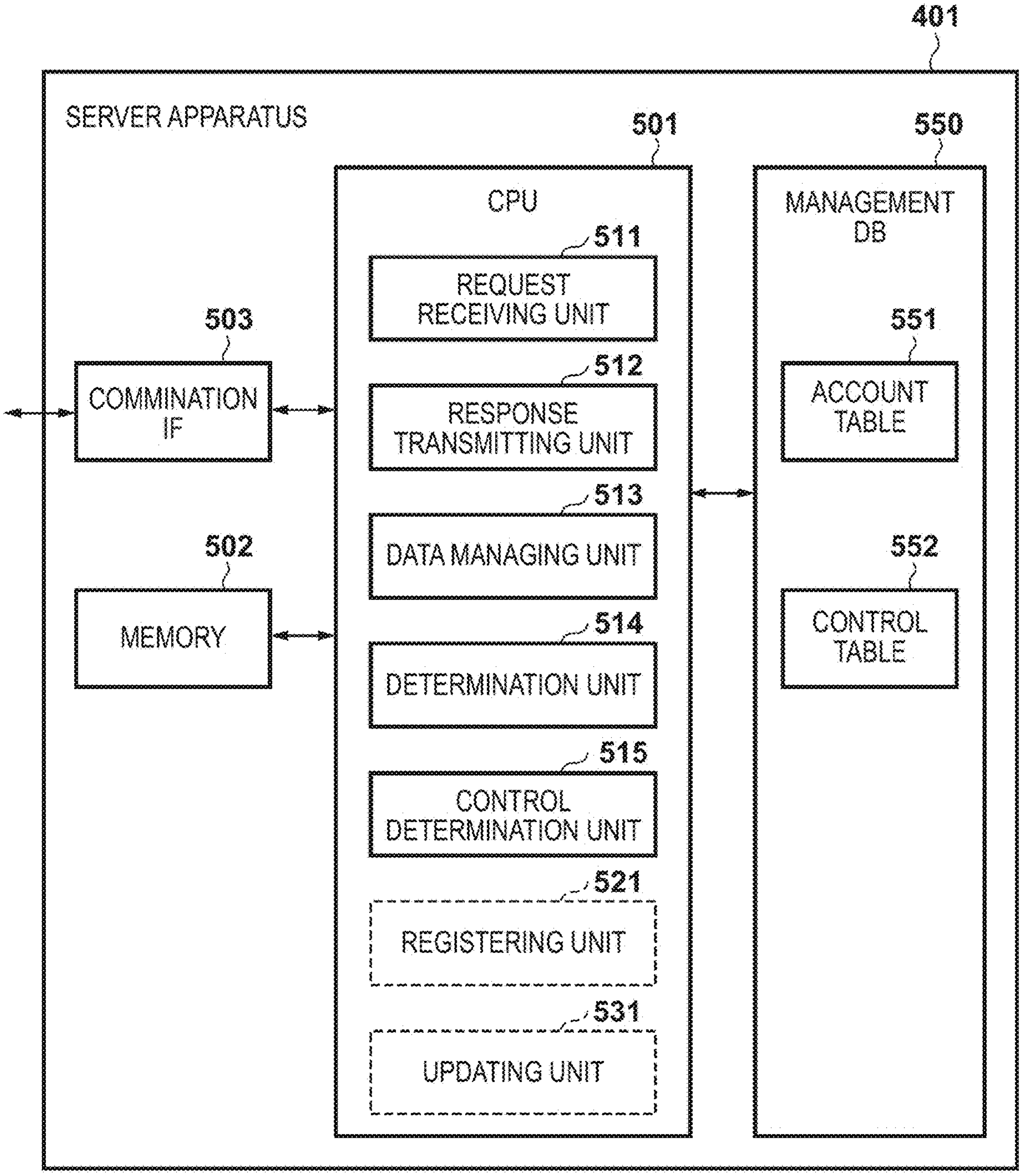
FIG. 5 is illustration of a server device.

FIG. 5 shows an example of structure of the server apparatus 401. The server apparatus 401 includes a CPU 501, a memory 502, a communication interface (I/F) 503, and a management database (DB) 550.

The CPU 501 controls the server apparatus 401 by executing a control program stored in the memory 502. The memory 502 may include ROM, RAM, SSD and HDD, etc. The communication I/F 503 is a communication circuit for the server apparatus 401 to communicate with other devices. For example, the communication I/F 503 communicates with the image forming apparatus 100 and the user terminals 402 that reside in the user environment E1. The communication I/F 503 may be a wired communication circuit or a radio communication circuit.

The memory 502 may include a non-transitory computer-readable storage medium. The memory 502 stores one or more computer programs executed by the CPU 501 and various types of data.

The management database 550 comprises a set of tables for managing control conditions of the sheet S to one or more of the image forming apparatuses 100 managed by the image forming system 400. More specifically, the management database 550 includes an account table 551 and a control table 552.

The account table 551 is a table for holding information on an account of a user who uses the sheet S provided through the subscription service. The account table 551 may include, for example, one or more of the following information items:

"user ID"

"subscription sheet"

The "user ID" is identification information for uniquely identifying each of the user accounts. The "subscription sheet" indicates the type of the sheet S for which the user subscribes to a contract with the operator (service provider) who operates the image-forming system 400. The contract type of the subscription service may be per image forming apparatus rather than per user. In such case, "image forming apparatus ID" may be used instead of "user ID". The control table 552 is a table that holds an image forming condition associated with the type information of the sheet S.

The control table 552 may include, for example, one or more of the following information items:

"sheet Information"

"image forming condition"

The "sheet information" indicates type information of the sheet S provided through the subscription service. The sheet information may be, for example, any information capable of uniquely identifying and specifying the type of the sheet S, such as the product name of the sheet S. The "image forming condition" is at least one image forming condition defined in advance for each type of the sheet S registered in the "sheet information". For example, image forming condition such as a throughput (number of sheets to be formed an image per unit time), a conveyance speed, and a fixing temperature.

As shown in FIG. 5, the CPU 501 implements various functions by executing the control program. A request receiving unit 511 receives a request signal from the image forming apparatus 100 through a communication I/F 503. The request signal may include an image forming apparatus ID (or user ID) and sheet information used to print an image.

A response transmitting unit 512 generates a response signal corresponding to the request signal, and transmits the response signal to the image forming apparatus 100 through the communication I/F 503. A data managing unit 513 registers data in the management database 550 and updates data held in the management database 550.

A determination unit 514 acquires sheet information associated with image forming apparatus ID (or user ID) from the account table 551 obtained through the data managing unit 513. A determination unit 514 determines whether the sheet information transmitted from the image forming apparatus 100 matches the sheet information registered in the account table 551. If they match, the image forming apparatus 100 is attempting to form images on the sheet S delivered from the service provider to the user according to the subscription contract. Therefore, the control determination unit 515 acquires image forming condition associated with the sheet information from the control table 552 through the data managing unit 513. The response transmitting unit 512 generates a response signal including an image forming condition acquired from the control table 552, and transmits the response signal to the image forming apparatus 100 via the communication I/F 503.

On the other hand, the sheet information transmitted from the image forming apparatus 100 may not match the sheet information registered in the account table 551. In this situation, unlike the sheet S delivered from the service provider to the user according to the subscription contract, the image forming apparatus 100 tries to form images on the sheet S prepared by the user on its own. Therefore, the control determination unit 515 generates a response signal indicating that the image forming condition determined by the image forming apparatus 100 itself should be used as it is. The response transmitting unit 512 transmits a response signal to the image forming apparatus 100 via the communication I/F 503.

As described above, in the present embodiment, as an example, a contract of the sheet S adopts a contract type in which the contract is made on a per-user basis. The contract information of the sheet S is registered in the server apparatus 401 in advance. The image forming condition is determined by the server apparatus 401.

A registering unit 521 is used in the second embodiment, and registers contract information (the control table 552) in the image forming apparatus 100.

An updating unit 531 is used in the third embodiment and the fourth embodiment to update a number (remaining number) of remaining sheets S subject to the subscription contract.

FIG. 6 illustrates an example of the account table 551 and an example of the control table 552. According to the account table 551 of this embodiment, the user identified by the user ID "U01" has a subscription for two types of sheets S distinguished by the type information of "PA" and "PB".

The control table 552 stores an image forming condition (throughput=32 ppm, fixing temperature=180° C.) associated with the type information "PA". Further, the control table 552 stores an image forming condition (throughput=16 ppm, fixing temperature=170° C.) associated with the type information "PB".

Here, "PA" may be assumed to be A4 sized paper. Type information of a typical plain paper sized A4 may be assumed to be "A4 (plain paper)." The control table 552 stores image forming condition (throughput=30 ppm, fixing temperature=185° C.) associated with "A4 (plain paper)". If A4 paper is used without a subscription contract, a print process is executed under the condition for the A4 (plain paper).

The "PB" may be assumed to be A5 sized papers. Type information of a typical plain paper sized A5 may be assumed to be "A5 (plain paper)." The control table 552 stores image forming condition (throughput=15 ppm, fixing temperature=175° C.) associated with "A5 (plain paper)". If A5 paper is used without a subscription contract, a print process is executed under the condition for the A5 (plain paper). As previously described, sheet properties of "PA" and "PB" are known. Therefore, printing can be performed under more advantageous conditions.

5. Sequence 5-1. Sequence Diagram

Figure 7:
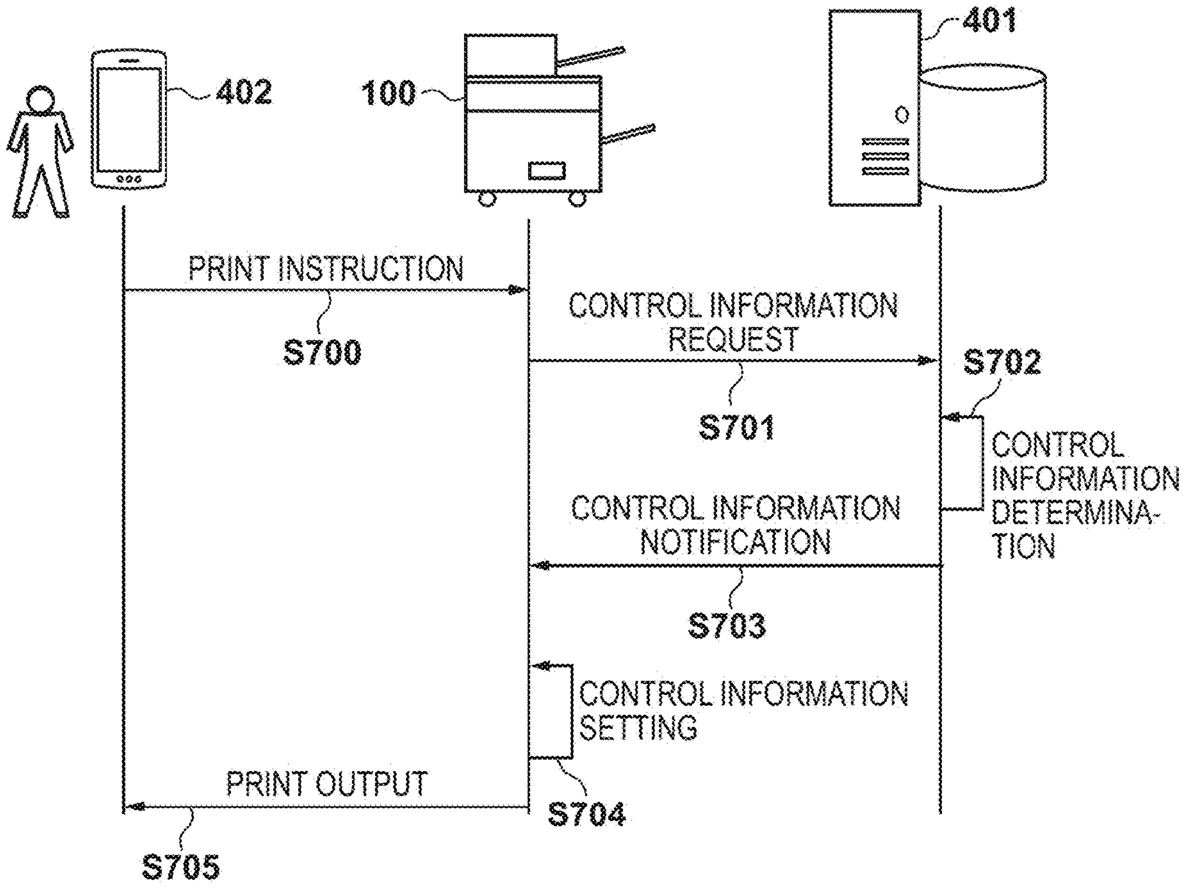
FIG. 7 is a sequence diagram showing a first embodiment.

FIG. 7 is a sequence diagram illustrating an example of a flow of a schematic process related to printing of a subscription sheet S (subscription target sheet S). A subscription sheet means a sheet for which a user has a subscription. This sequence mainly involves the image forming apparatus 100, the server apparatus 401 and the user-terminal 402. Before starting the sequence, the account information of the user is registered in the account table 551 of the management database 550. The type information of the subscription target sheet S and an image forming condition are registered in the control table 552.

In S700, the user terminal 402 transmits user account information and a print job including data of images to be printed to the image forming apparatus 100 installed in the user environment E1 (print instruction). The image forming apparatus 100 receives the print instruction from the user terminal 402.

The user account information includes a user ID. The print job includes type information indicating the type of the sheet S set by the user through the operation unit 30 or the user terminal 402. As described above, the CPU 301 receives and accepts the type information through the operating unit 30 or the user terminal 402.

In S701, the image forming apparatus 100 transmits the account information and the print job received from the user terminal 402 to the server apparatus 401 via the external network N2 (image forming condition request). The server apparatus 401 receives the image forming condition request (print information request) including the account information and the print job from the image forming apparatus 100. The print information request may be referred to as a request signal or request.

In S702, the control determination unit 515 of the server apparatus 401 determines image forming condition. For example, the data managing unit 513 refers to the account table 551, acquires the type information associated with the user ID included in the user account information received in S701, and determines whether the acquired type information matches the type information included in the print job. The type information included in the print job may not be included in the type information indicating the type of the sheet S for which the user has a subscription.

Here, the control determination unit 515 generates a response signal indicating that image forming condition determined by the image forming apparatus 100 should not be changed. On the other hand, as shown in FIG. 6, it is assumed that a print job including "PA" as the type information is transmitted from a user who has been assigned "U01" as the user ID. In this case, the account table 551 indicates that the user has a subscription for "PA". Therefore, the control determination unit 515 refers to the control table 552 and acquires image forming condition (throughput=32 ppm, fixing temperature=180° C.) associated with the "PA".

In S703, the control determination unit 515 generates a response signal including the determined image forming condition, and transmits the response signal to the image forming apparatus 100. This may be referred to as an image forming condition notification. The response signal may be referred to as a response. The image forming apparatus 100 receives, from the server apparatus 401, a response signal including image forming condition.

In S704, the CPU 301 of the image forming apparatus 100 sets the image forming condition to the image forming apparatus 100 based on the received response signal (image forming condition setting). For example, the CPU 301 may set the throughput to 32 ppm and drive the motor M3 as 32 ppm. Further, the CPU 301 controls the heater 18 so that the fixing temperature of the heater 18 becomes a target temperature corresponding to 180° C.

In S705, the CPU 301 forms images on the sheet S according to the print job (print out).

5-2. Image Forming Apparatus Flow Chart

Figure 8:
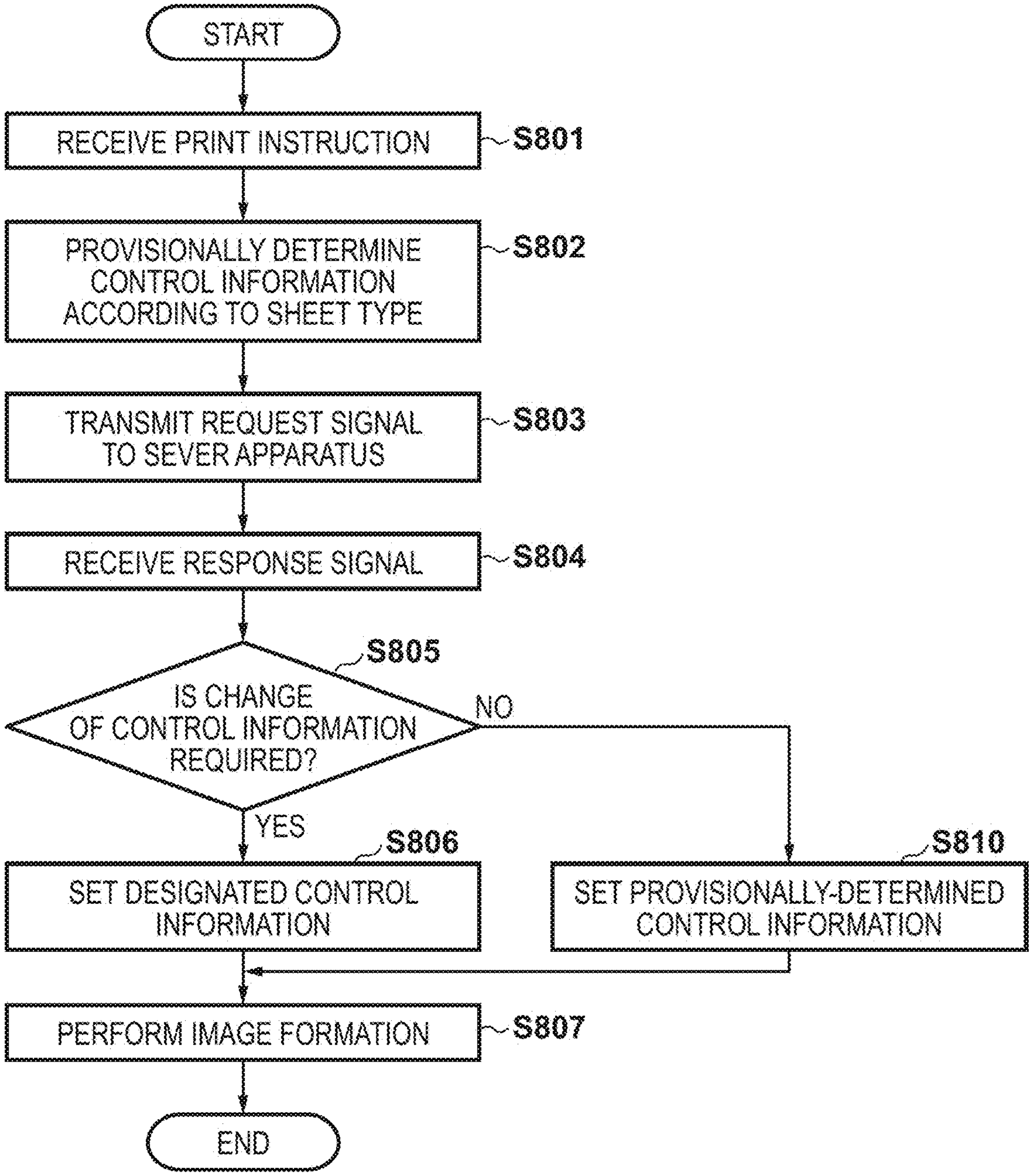
FIG. 8 is a flowchart showing a control method of an image forming apparatus.

FIG. 8 illustrates a control method executed by the CPU 301 of the image forming apparatus 100 in accordance with the control program.

In S801, the CPU 301 receives a print instruction from the user terminal 402. The print instruction includes a user ID and a print job (which may include size information and type information of the sheet S).

In S802, the CPU 301 (selection unit 312) temporarily determines an image forming condition corresponding to the type of the sheet S designated by the print instruction. The image forming condition may be an image forming condition that is initially set (default setting) in the image forming apparatus 100.

The image forming condition may be an image forming condition set through the operating unit 30.

In S803, the CPU 301 (request transmitting unit 311) transmits a request signal to the server apparatus 401.

The request signal includes the user ID and the print job (including at least the type information).

In S804, the CPU 301 (response receiving unit 313) receives a response signal from the server apparatus 401.

In S805, the CPU 301 (determination unit 314) determines whether the image forming condition needs to be changed based on the response signal. If the image forming condition needs to be changed, the CPU 301 proceeds from S805 to S806.

In S806, the CPU 301 (setting unit 315) sets the image forming condition specified by the response signal to the image forming apparatus 100. The CPU 301 then proceeds from S806 to S807.

If the image forming condition does not need to be changed, the CPU 301 proceeds from S805 to S810. In S810, the CPU 301 (setting unit 315) sets the provisionally determined image forming condition to the image forming apparatus 100. The CPU 301 then proceeds from S810 to S807.

In S807, the CPU 301 (control unit 316) performs image formation in accordance with image forming condition.

5-3. Flowchart of the Server Apparatus

Figure 9:
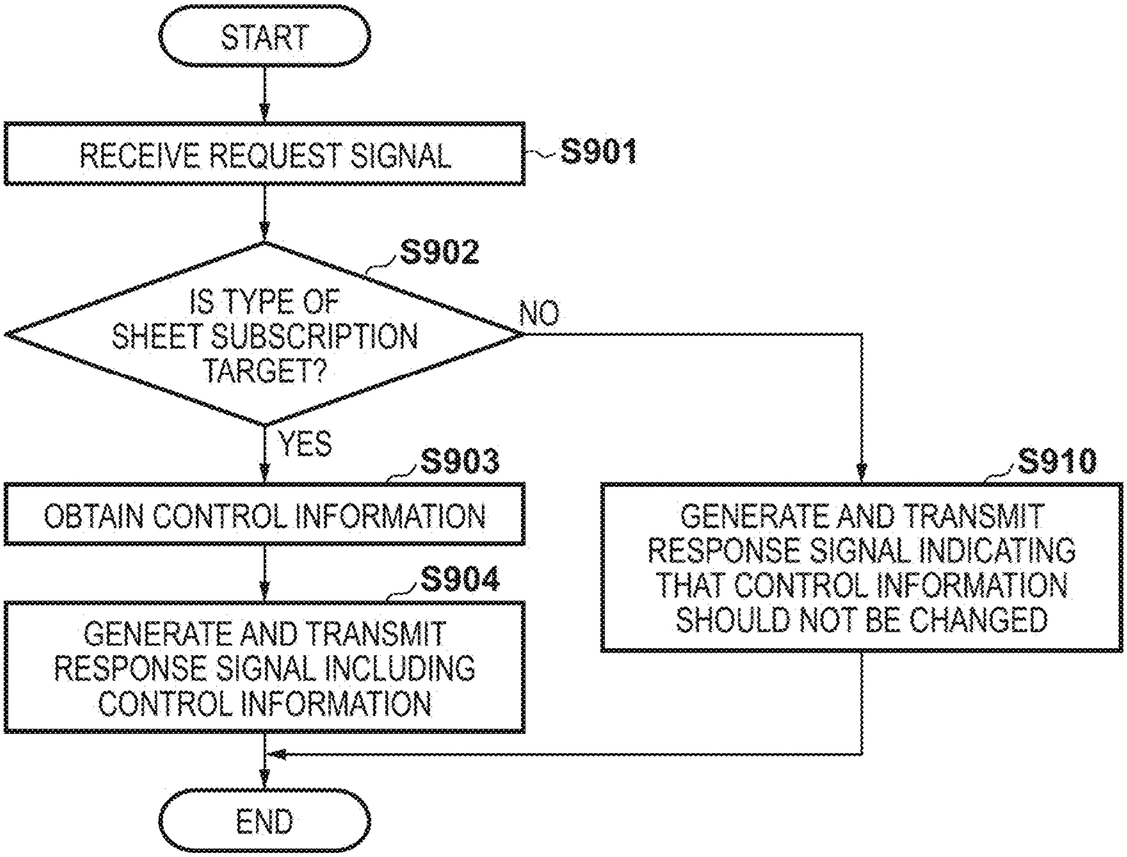
FIG. 9 is a flowchart showing how to control a server device.

FIG. 9 illustrates a control method executed by the CPU 501 of the server apparatus 401 according to the control program.

In S901, the CPU 501 (request receiving unit 511) receives a request signal from the image forming apparatus 100.

The request signal includes user account information (user ID) and a print job (type information).

In S902, the CPU 501 (determination unit 514) determines whether the type of the sheet S specified by the received request signal is a subscription target. For example, the determination unit 514 refers to the account table 551 through the data managing unit 513 and acquires type information indicating the contract type associated with the user ID. The determination unit 514 determines whether the type information acquired from the account table 551 matches the type information included in the request signal. If the type of the sheet S specified by the request signal is the subscription target, CPU 501 proceeds from S902 to S903.

In S903, the CPU 501 (control determination unit 515) acquires, from the control table 552, an image forming condition corresponding to the type of the sheet S designated by the request signal. In other words, the image forming condition corresponding to the type of the sheet S specified by the request signal is acquired among a plurality of sheet types for which the user has a subscription.

In S904, the CPU 501 (control determination unit 515 and response transmitting unit 512) generates a response signal including the image forming condition acquired from the control table 552, and transmits the response signal to the image forming apparatus 100.

On the other hand, if it is determined in S902 that the type of the sheet S designated by the request signal is not the subscription target, the CPU 501 proceeds from S902 to S910. In S910, the CPU 501 (control determination unit 515 and response transmitting unit 512) generates a response signal indicating that the provisionally determined image forming condition should not be changed, and transmits the response signal to the image forming apparatus 100.

In the first embodiment, information that can be an image forming condition may be any information that can be changed depending on the type of the sheet S. The image forming condition illustrated in FIG. 6 is information indicating a control mode, and this is only an example. For example, a numerical value may be adopted as the throughput. In this instance, the units of throughput value may be, for example, page-per-minute (ppm). The unit "ppm" indicates the number of sheets to be formed an image per unit time. As described above, any image forming condition that can be recognized by the image forming apparatus 100 can be adopted as image forming condition. The image forming condition may be any of a sheet conveyance speed, a fixing temperature of the fixing device, a charging voltage, a developing voltage, a primary transfer voltage, or a secondary transfer voltage.

Embodiment 2

In the second embodiment, a contract type in which the contract of the sheet S is concluded in units of image forming apparatus is adopted. When the subscription contract of the sheet S is concluded, the contract information of the sheet S is registered in the server apparatus 401. In the second embodiment, the image forming apparatus 100 determines image forming condition. In the second embodiment, the account table 551 may not be provided because it is a contract in units of image forming apparatus. However, the control table 552 is still required.

Figure 10:
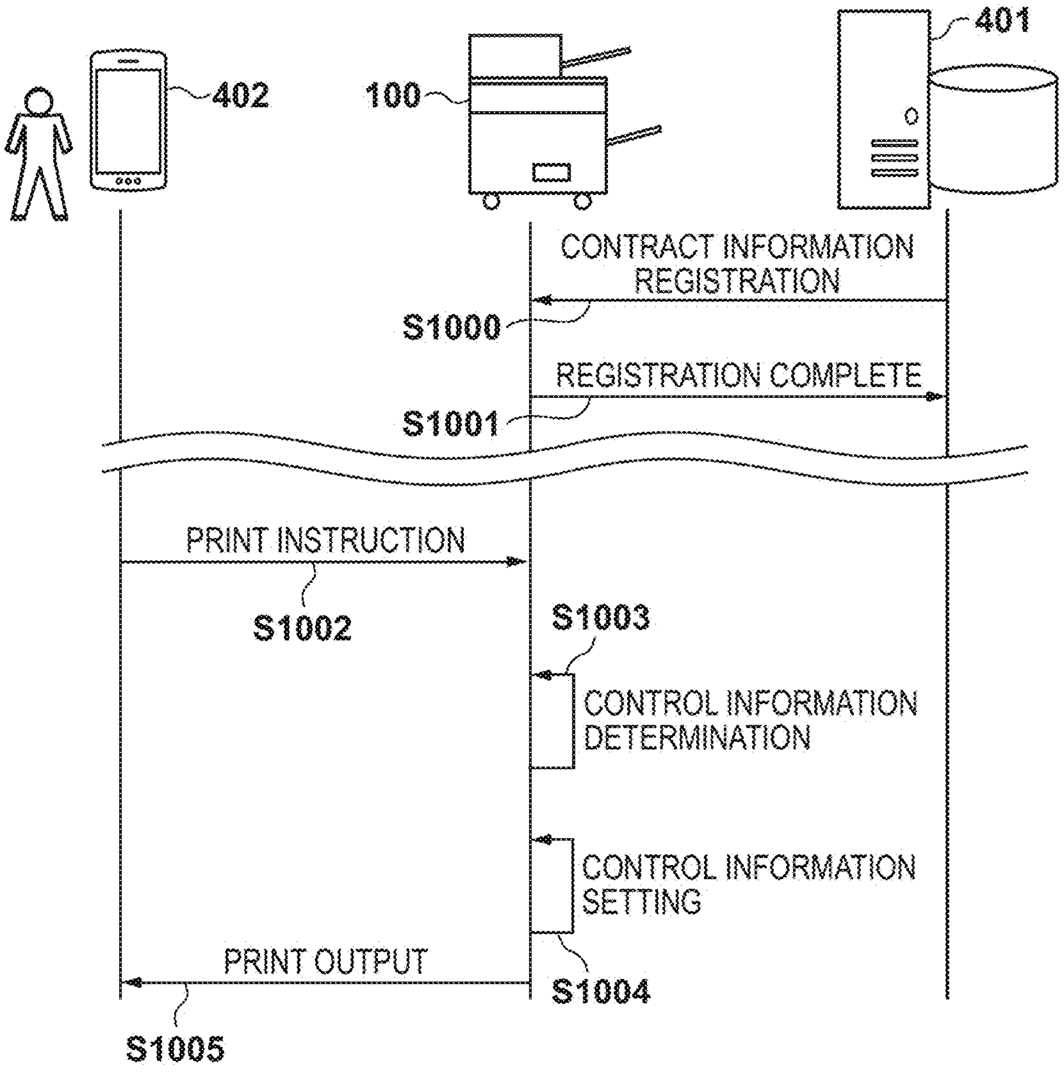
FIG. 10 is a sequence diagram showing a second embodiment.

FIG. 10 shows a sequence diagram illustrating a method of printing an image on a sheet S of a subscription type. The subscription type means a type of a subscription or a type of sheet that the subscription entitles a user to print. This sequence involves primarily the image forming apparatus 100, the server apparatus 401 and the user terminals 402.

In S1000, the CPU 501 (registering unit 521) of the server apparatus 401 registers contract information including the type information of the sheet S for which the image forming apparatus 100 has a subscription in the memory 302 of the image forming apparatus 100 with respect to the image forming apparatus 100. Specifically, the control table 552 including the type information of the sheet S supplied to the image forming apparatus 100 according to the subscription contract and an image forming condition associated with the type information is transmitted to the image forming apparatus 100. The CPU 301 (registering unit 321) of the image forming apparatus 100 writes the received control table 552 into the memory 302.

In S1001, the CPU 301 (registering unit 321) of the image forming apparatus 100 transmits a completion signal indicating that the registration of the contract information (control table 552) has been completed to the server apparatus 401. Upon receiving the completion signal, the CPU 501 (registering unit 521) of the server apparatus 401 terminates the registration process of the contract information. Here, although the server apparatus 401 registers the contract information in the image forming apparatus 100, the user may register the contract information in the image forming apparatus 100 by operating the operation unit 30 or the user terminal 402.

In S1002, the CPU 301 of the image forming apparatus 100 receives a print instruction (print job) from the user terminal 402 existing in the user environment E1. The print instruction includes image data of an image to be printed, size information of the sheet S, and type information of the sheet S.

In S1003, the CPU 301 (selection unit 312) of the image forming apparatus 100 determines an image forming condition based on the type information of the sheet S included in the print job. For example, the determination unit 314 determines whether or not the type information (designated type) designated by the print job matches the type information (subscription type) included in the control table 552 held in the memory 302. When the designated type matches the subscription type, the control determination unit 322 acquires an image forming condition associated with the designated type (subscription type) from the control table 552. On the other hand, when the designated type and the subscription type do not coincide with each other, the CPU 301 (selection unit 312) determines an image forming condition corresponding to the designated type. Another control table for storing the association between the designated type and the image forming condition may be stored in the memory 302. The other control table may be the same as the control table used in the provisional determination of the image forming condition in the first embodiment.

For example, when the designated type is PB, PB is registered as the subscription type in the control table 552 illustrated in FIG. 6. Therefore, the control determination unit 322 determines an image forming condition (throughput=30 ppm, fixing temperature=170° C.) corresponding to PB from the control table 552. S1004 and S1005 are the same as S704 and S705, respectively.

Figure 11:
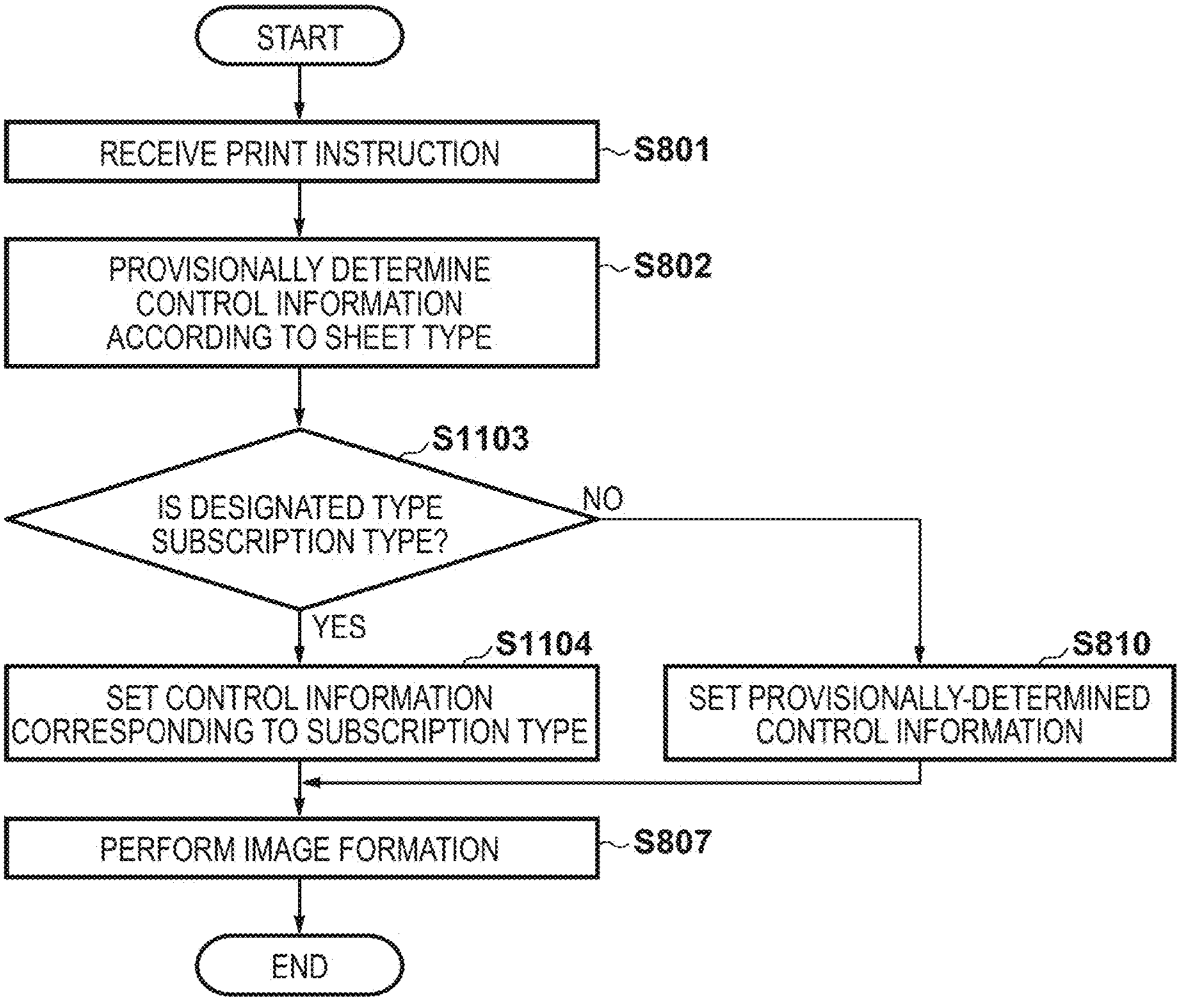
FIG. 11 is a flowchart showing a control method of an image forming apparatus.

FIG. 11 is a flow chart illustrating a control method executed by the CPU 301 of the image forming apparatus 100. As described with reference to FIG. 10, the server apparatus 401 registers the contract information (control table 552) in the image forming apparatus 100 in advance. In FIG. 11, S803 to S806 shown in FIG. 8 are replaced with S1103 and S1104. Therefore, S1103 and S1104 will be mainly described. The CPU 301 proceeds from S802 to S1103.

In S1103, the CPU 301 (determination unit 314) determines whether or not the designated type is a subscription type. Specifically, it is determined whether or not the type information indicating the type of the sheet S designated by the print job matches any type information held in the control table 552 of the memory 302. If the designated type does not match the subscription type, the CPU 301 proceeds from S1103 to S810. If the designated type matches the subscription type, the CPU 301 proceeds from S1103 to S1104.

In S1104, the CPU 301 (control determination unit 322 and setting unit 315) acquires an image forming condition corresponding to the subscription type (designated type) from the control table 552 and sets the image forming condition in the image forming apparatus 100. For example, the throughput corresponding to the control mode included in image forming condition is set to the target rotational speed of the motor M3. Further, the fixing temperature corresponding to the control mode included in image forming condition is set as the target temperature of the heaters 18. The CPU 301 then proceeds from S1104 to S807.

In the second embodiment, the control table 552 is stored in the memory 302 of the image forming apparatus 100. However, the control table 552 may still be held in the server apparatus 401. In this instance, the CPU 301 may access the server apparatus 401 in S1104 and acquire an image forming condition from the control table 552 held in the management database 550 through the data managing unit 513 of the server apparatus 401.

Embodiment 3

1. Basic Concept

The first and second embodiments have been described on the assumption that there is no sensor for detecting the type of the sheet S in the image forming apparatus 100. Therefore, the sheet information specified by the user included in the print job is used as the type information.

Incidentally, before the sheet S of the type of the subscription target is delivered, the user rarely completely consumes the sheet S of the type of the subscription target. In this case, the user may prepare a sheet S of another type that is not a subscription target, and place the sheet S in the sheet cassette 8. In this case, the user may misunderstand the type of the sheet S placed in the sheet cassette 8 as the subscription type and erroneously set the type information through the operation unit 30. In the first and second embodiments, an image forming condition for the subscription type may be used in such cases.

Therefore, in the third embodiment, a more suitable image forming condition is set and configured using the medium sensor 25 and the counter 304 that monitors the number of remaining sheets S of the subscription type.

2. Database

FIG. 12 shows an example of the account table 551 and an example of the control table 552 in the third embodiment. The account table 551 stores the user ID of the user who is contracted with the subscription service, type information indicating the type of the subscription target sheet S, and the number of the remaining subscription target sheets S (the number of remaining subscription sheets) in association with each other. The control table 552 in the third embodiment is similar to the control table 552 in the first embodiment.

3. Sequence

Figure 13:
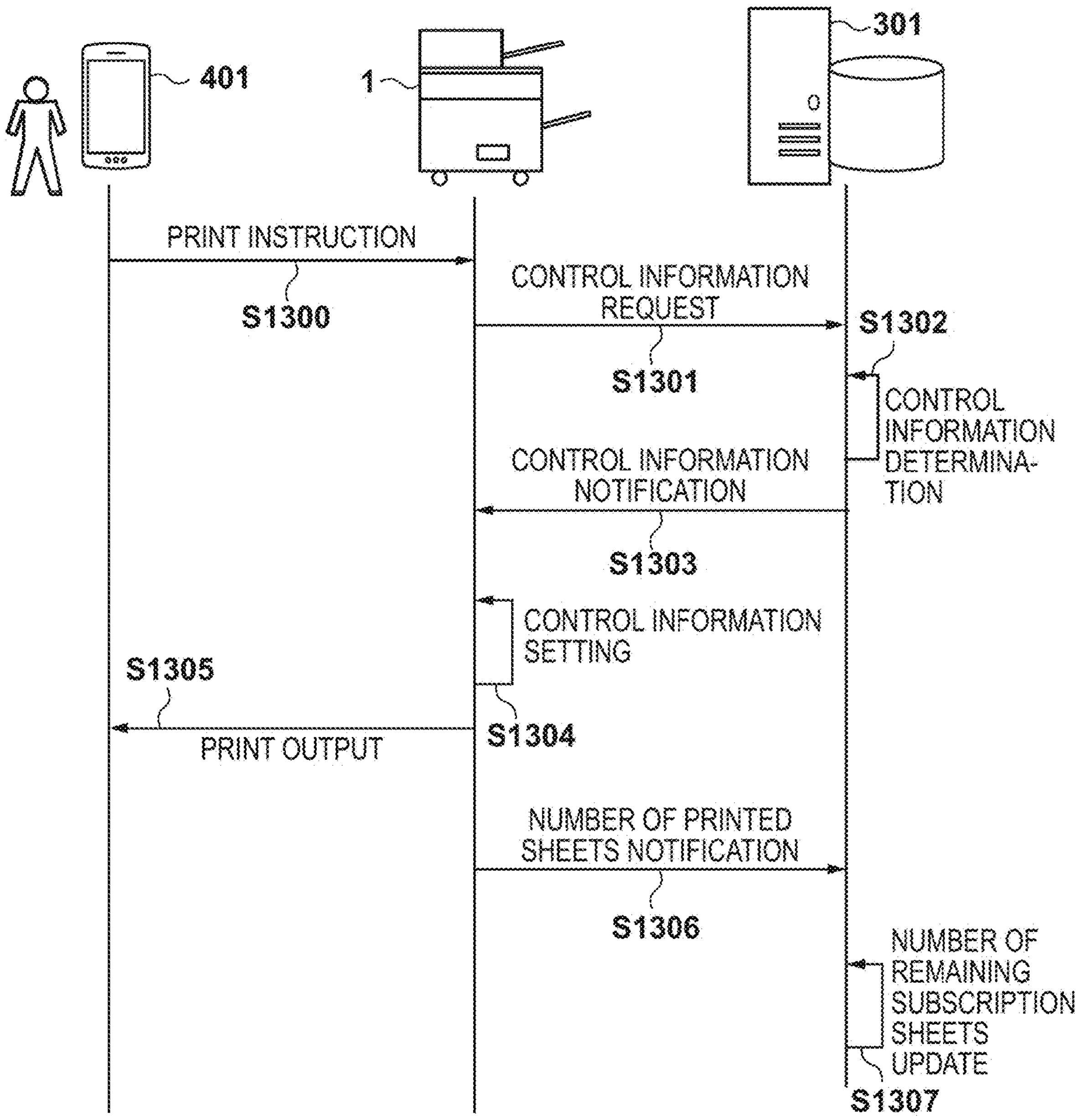
FIG. 13 is a sequence diagram showing a third embodiment.

FIG. 13 is a sequence diagram illustrating an example of a method of printing an image on a sheet S for which a user has a subscription. This sequence involves primarily the image forming apparatus 100, the server apparatus 401 and the user terminals 402. Prior to the beginning of the sequence, the user's account information is registered in the account table 551 of the management database 550. The contract information of the sheet S is registered in the control table 552.

In S1300, the user terminal 402 transmits a print instruction to the image forming apparatus 100. The print instruction includes user account information and a print job including image data of an image to be printed. The image forming apparatus 100 receives the print instruction from the user terminal 402.

In S1301, the image forming apparatus 100 generates a request signal based on the received print instruction, and transmits the request signal to the server apparatus 401 (image forming condition request). The request signal includes the account information received from the user terminal 402, the print job, and type information indicating the type of the sheet S acquired by the medium sensor 25. The server apparatus 401 receives the request signal for requesting an image forming condition from the image forming apparatus 100. For example, the account information includes "U01" as a user ID. Further, the type information is set as "PA". Note that the timing at which the type of the sheet S is detected may be immediately before the start of printing, or may be another timing.

In S1302, the server apparatus 401 determines an image forming condition based on the request signal. Further, the data managing unit 513 of the server apparatus 401 refers to the account table 551 based on the request signal, and acquires the subscription type associated with the user ID (e.g. "U01"). The determination unit 514 determines whether or not a type detected by the medium sensor 25 is a subscription type. According to FIG. 12, the subscription types are PA and PB. Therefore, the type detected by the medium sensor 25 matches a subscription type. Therefore, the control determination unit 515 refers to the control table 552 and acquires the image forming condition associated with PA. That is, the throughput is determined to be 32 ppm. The fixing temperature is determined to be 180° C. If the type detected by the medium sensor 25 does not match a subscription type, the image forming apparatus 100 determines an image forming condition based on the type detected by the medium sensor 25.

In S1303, the server apparatus 401 transmits a response signal including the determined image forming condition to the image forming apparatus 100 (image forming condition notification). The image forming apparatus 100 receives the response signal including the image forming condition from the server apparatus 401.

In S1304, the image forming apparatus 100 sets the received image forming condition to the image forming apparatus 100.

In S1305, the image forming apparatus 100 controls the image forming apparatus 100 according to image forming condition to form images on the sheet S (print out). The CPU 301 of the image forming apparatus 100 counts the number of subscription sheets S, on which an image is printed, by the counter 304.

The counter 304 independently counts the number of PA and the number of PB because the user has a subscription for both of PA and PB.

In S1306, the image forming apparatus 100 transmits the account information, the number of printed sheets, which is the counted value of the counter 304, and the identification information to the server apparatus 401 (print number notification). The server apparatus 401 receives the number of printed sheets, the identifying information, and the account information from the image forming apparatus 100.

In S1307, the data managing unit 513 of the server apparatus 401 refers to the account table 551 based on the account information, and updates the number of remaining subscription sheets. For example, the data managing unit 513 subtracts the number of printed sheets from the number of remaining subscription sheets registered in the account table 551. When the sheets S as a subscription target through the subscription service is delivered to the user, the data managing unit 513 updates the number of remaining subscription sheets associated with the user. For example, the number of delivered sheets S is added to the number of remaining subscription sheets.

4. Flowchart 4-1. Image Forming Apparatus

Figure 14:
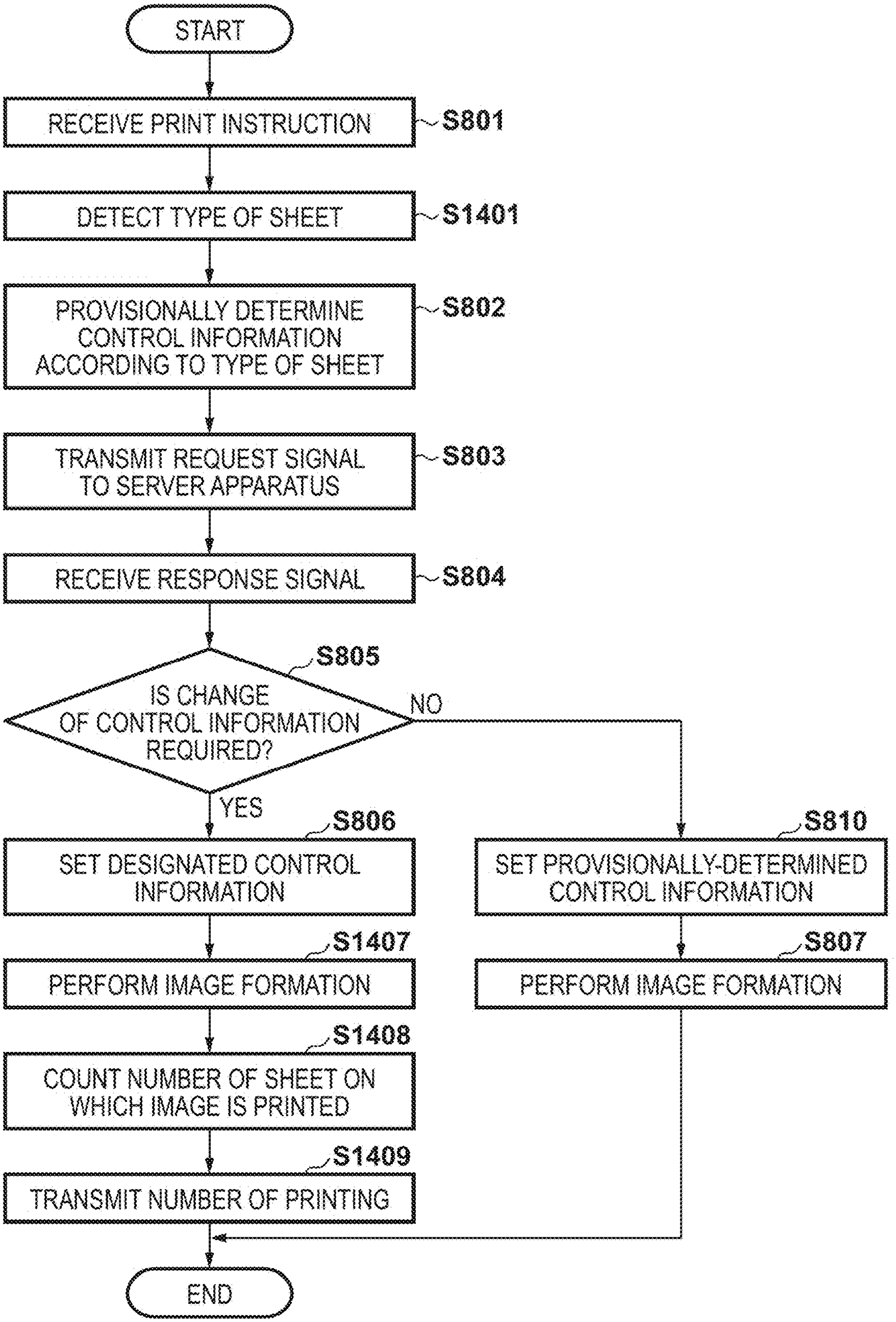
FIG. 14 is a flowchart showing a control method of an image forming apparatus.

FIG. 14 shows a control method performed by the CPU 301 of the image forming apparatus 100 according to the control program. Note that the same reference numerals are assigned to the processes described above, and the description thereof will be omitted. S1401 is inserted between S801 and S802. Also, S1407 to S1409 are added after S806.

In S1401, the CPU 301 uses the medium sensor 25 to detect the type of the sheet S. The medium sensor 25 may include a light emitting element and a light receiving element, and may detect the type of the sheet S by detecting the reflected light and the transmitted light from the sheet S. In addition, a sensor including an ultrasonic receiver and an ultrasonic transmitter may be employed as the medium sensor 25. The CPU 301 then proceeds from S1401 to S802.

The CPU 301 proceeds from S806 to S1407. In S1407, the CPU 301 (control unit 316) performs image formation on the sheet S that is the subscription target.

In S1408, the CPU 301 (counting unit 331) uses the counter 304 to count the number of sheets on which an image is printed.

In S1409, the CPU 301 (notification unit 332) transmits the number of printed sheets acquired by the counter 304, the type information, and the account information to the server apparatus 401.

If the type detected by the medium sensor 25 is not the subscription type, it is determined No in S805, and the CPU 301 executes S810 and S807. Since the type detected by the medium sensor 25 is not the subscription type, the number of printed sheets is not notified to the server apparatus 401.

4-2. Server Apparatus

Figure 15:
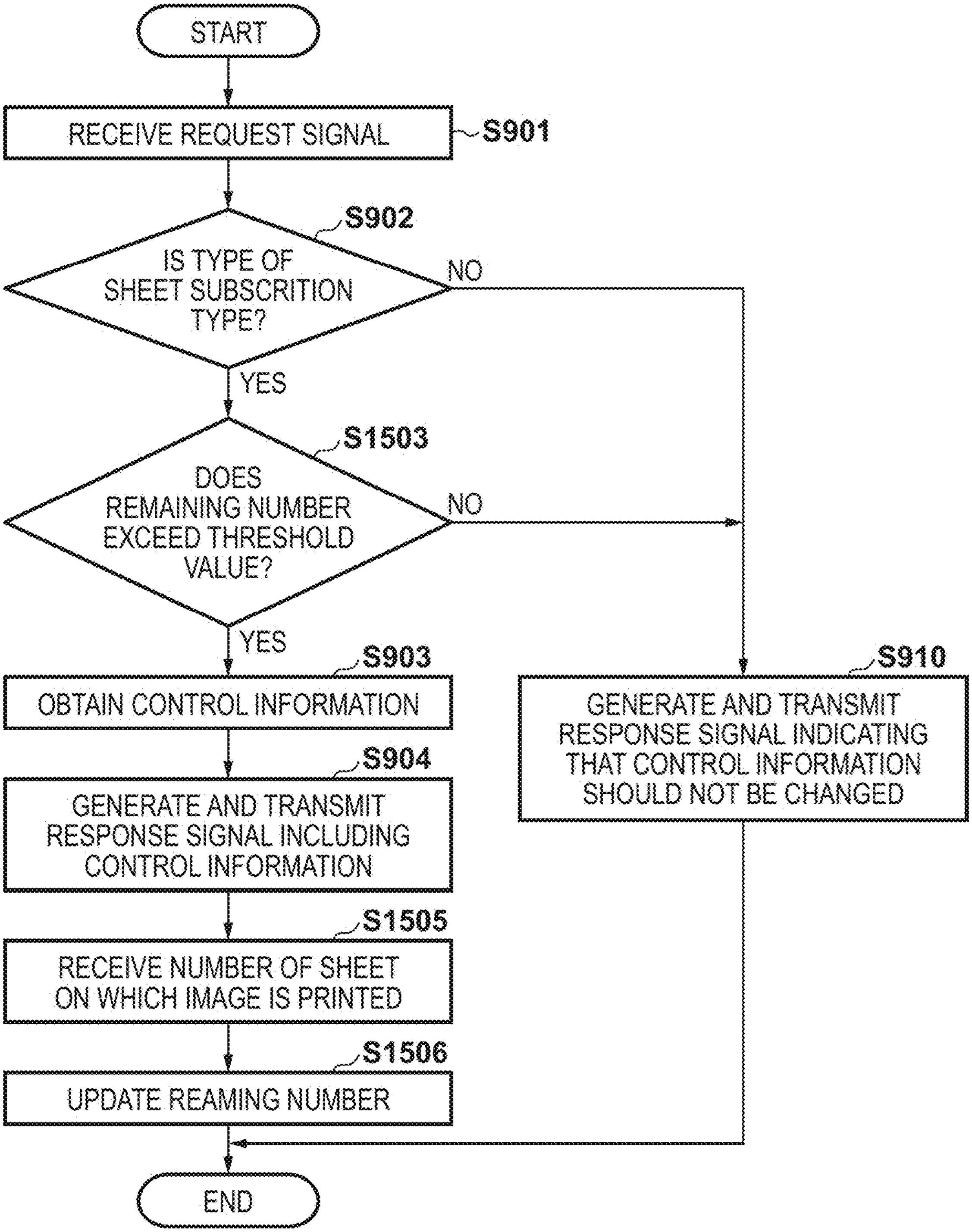
FIG. 15 is a flowchart showing how to control a server device.

FIG. 15 illustrates a control methods executed by the CPU 501 of the server apparatus 401 in accordance with the control program. Note that the same reference numerals are assigned to the processes described above, and the description thereof will be omitted. S1503 is added between S902 and S903. In addition, S1505 and S1506 are added after S904.

When it is determined that the type detected by the medium sensor 25 is the subscription type in S902, the CPU 501 proceeds from S902 to S1503. In S1503, the CPU 501 (determination unit 514) refers to the account table 551 based on the user ID and the type information, acquires the number of remaining subscription sheets, and determines whether or not the number of remaining subscription sheets exceeds a threshold (e.g. 0). The threshold may be an integer greater than or equal to 1. If the number of remaining subscription sheets does not exceed the threshold (i.e. if the number of remaining subscription sheets is less than or equal to the threshold), the CPU 501 proceeds from S1503 to S910.

The CPU 501 proceeds from S904 to S1505. In S1505, the CPU 501 (updating unit 531) receives the number of sheets on which an image are printed from the image forming apparatus 100. The number of sheets is the number of printed sheets S subject to the subscription. In addition, the user ID and the type information are also received along with the number of printed sheets.

In S1506, the CPU 501 (updating unit 531) updates the number of remaining subscription sheets held in the account table 551 based on the received number of printed sheets. The updating unit 531 specifies the number of remaining subscription sheets associated with the received user ID and the type information among the plurality of numbers of remaining subscription sheets S registered in the account table 551, and subtracts the number of printed sheets from the specified number of remaining subscription sheets S. When the type detected by the medium sensor 25 is not the subscription type, the number of remaining is not updated.

As described above, in the third embodiment, an image forming condition may be determined according to the number of remaining subscription sheets. When the remaining number becomes 0, the CPU 501 may determine that the subscription contract has ended. Further, instead of the remaining number, the image forming condition may be determined based on the number of contract effective days or the contract termination date. For example, if the number of remaining contract effective days is zero, the CPU 501 may proceed from S1503 to S910. In addition, if the date of receipt of the request signal is after the contract is terminated, the CPU 501 may proceed from S1503 to S910.

As illustrated in FIG. 12, in the third embodiment, the number of remaining subscription sheets S is stored in the account table 551. As described in the second embodiment, the account table 551 may be registered in the memory 302 of the image forming apparatus 100. In this case, as described in the second embodiment, the CPU 301 of the image forming apparatus 100 performs updating of the number of remaining sheets S in S1506 and determination of the number of remaining sheets S in S1503. For example, S1503 is inserted between S1103 and S1104. S1506 is inserted after S807.

Embodiment 4

1. Basic Concept

The timing at which the account table 551 is registered in the server apparatus 401 is a timing at which the user concludes (updates) a subscription contract. That is, the account table 551 is registered (updated) at this timing.

However, if the account table 551 is updated at the same time as the subscription contract is concluded, inconvenience may occur. For example, although no sheet S has been delivered through the subscription service to the user's site yet, the number of remaining subscription sheets S may decrease.

Therefore, a certain code printed or stuck on wrapping paper of the sheet S delivered to the user may be read by a camera, and the reading result may be transmitted to the server apparatus 401. The server apparatus 401 starts (updates) the subscription contract when the code included in the received read result is a code associated for the subscription contract. That is, when the code received from the user is the code associated for the subscription contract, the update (reduction) of the number of remaining subscription sheets is started. In this way, the date of conclusion of the subscription contract may be different from the start date. This will prevent the number of remaining subscription sheets S contract from decreasing even though no sheet S has been delivered by the subscription service to the user's site.

2. User Terminal

Figure 16:
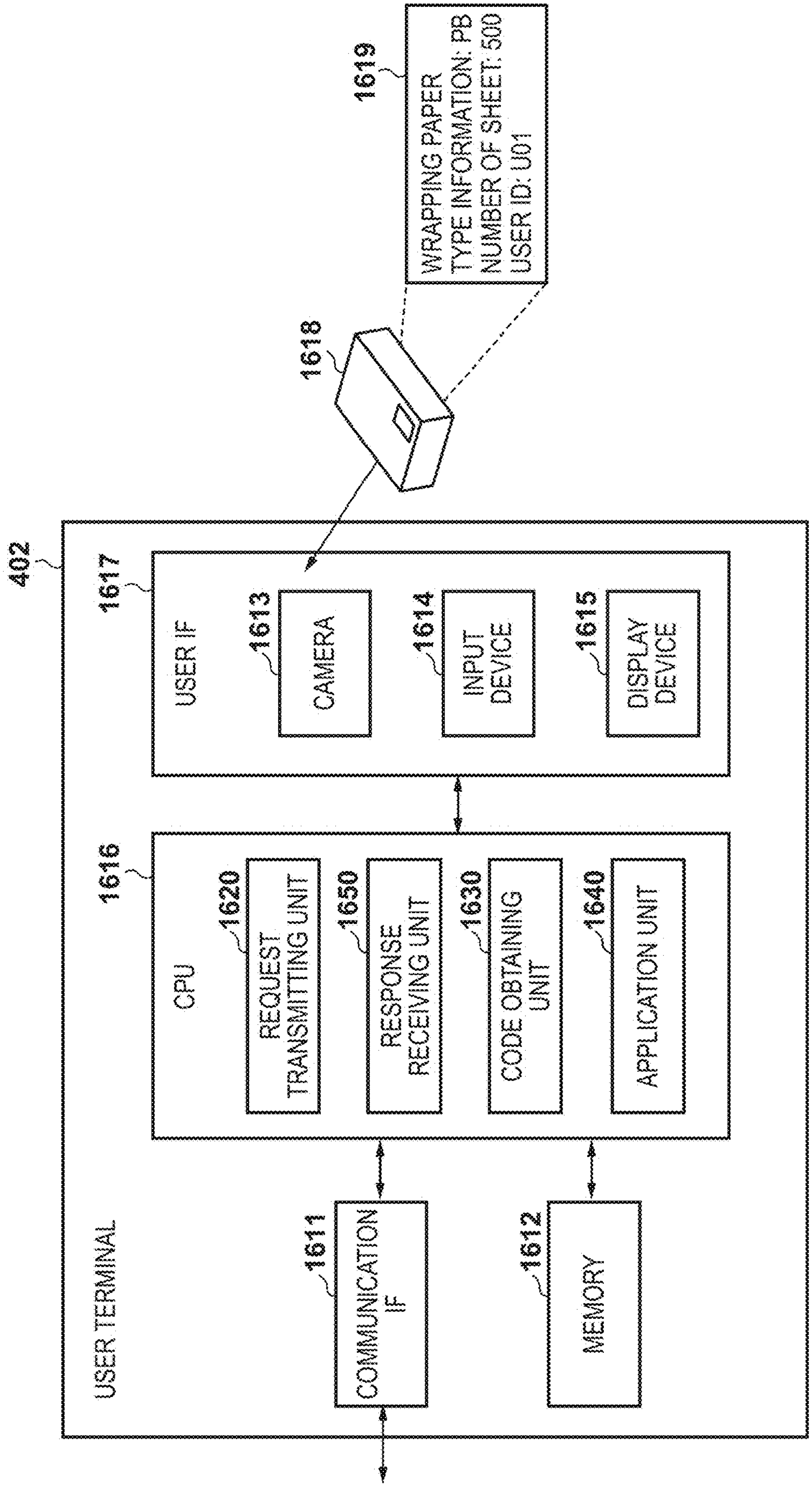
FIG. 16 is illustration of a user terminal.

FIG. 16 is a block diagram illustrating an example of structure of the user terminal 402 according to the present embodiment. The user terminal 402 includes a communication I/F 1611, a memory 1612, a user I/F 1617 (a camera 1613, an input device 1614, a display device 1615), and a CPU 1616.

The communication I/F 1611 is an interface (communication circuitry) for the user terminal 402 to communicate with other apparatuses. As shown in FIG. 4, for example, the communication I/F 1611 communicates with the image forming apparatus 100 residing in the user environment E1 and the server apparatus 401 residing in the remote environment E2. The communication I/F 1611 may be a wired communication interface or a radio communication interface. When the communication I/F 1611 is a wireless communication interface, the communication I/F 1611 may be, for example, a WLAN interface communicating with a WLAN access point or a cellular communication interface communicating with a cellular base station. Although only a single communication I/F 1611 is illustrated in FIG. 16, the user terminal 402 may include a plurality of communication module for communicating with the image forming apparatus 100 and the server apparatus 401. Communication between the user terminal 402 and the image forming apparatus 100 may be performed using a communication protocol for connecting to peripheral devices such as Bluetooth (registered trademark) or Universal Serial Bus (USB).

The memory 412 may include any type of storage medium, for example, a semiconductor memory such as a ROM or RAM, an optical disk, or a magnetic disk. The memory 1612 may include a non-transitory computer-readable storage medium. The memory 1612 stores one or more computer programs executed by the CPU 1616 and various types of data.

The camera 1613 is a module capable of capturing images or videos of a subject. The camera 1613 is used to optically read unique code information 1619 assigned to a wrapping paper (sheet package) 1618 of the sheet S delivered under the subscription contract. The code information 1619 may be a two-dimensional barcode or the like. Alternatively, the code information 1619 may be information stored in a radio frequency identification (RFID) tag. In this case, the camera 1613 will be replaced by a tag reader.

The input device 1614 is used as a user interface for accepting an operation and an information input by a user. The input device 1614 may include, for example, one or more of a touch sensor, a keypad, a keyboard, a pointing device, and a microphone. The code information 1619 may include, for example, type information of the sheet S, the number of sheets S included in the sheet package, and user ID.

The display device 1615 is used to display images and information. The display device 1615 may be composed of, for example, Liquid Crystal Display (LCD) or Organic Light-Emitting Diode (OLED).

The CPU 1616 provides various functions of the user terminal 402 by executing computer programs stored in the memory 1612. More specifically, as illustrated in FIG. 16, the CPU 1616 may work as a request transmitting unit 1620, a code obtaining unit 1630, a response receiving unit 1650, and an application unit 1640. Only the functions related to registering the information of the code information 1619 specific to the account table 551 are mainly described herein. However, the CPU 1616 may also provide the user with many other functions that the user terminal 402 typically has.

The request transmitting unit 1620 may acquire the status of the image forming apparatus 100 (e.g. power on/off, remaining toner amount, and the like) and present the acquired status to the user. When the image forming apparatus 100 is selected by the user via the input device 1614 and a print instruction is given, the request transmitting unit 1620 transmits a print job including image data of an image to be printed to the image forming apparatus 100. Accordingly, the image forming apparatus 100 prints the image on the sheet S according to the print job.

The code obtaining unit 1630 is used by the user to register (update) the type information in the server apparatus 401. The code obtaining unit 1630 acquires a read result (a read image or a character decoded from a read image) of the code information 1619 through the camera 1613. As an example, the code information 1619 may be an optically readable code printed on the wrapping paper 1618 of the sheet package. Alternatively, a piece of paper on which the code information 1619 is printed may be included in the sheet package. In this case, the code obtaining unit 1630 optically reads the code information 1619 using the camera 1613. As another example, the code information 1619 may be a code artificially (e.g. visually) readable by a human being. In this case, the code obtaining unit 1630 may acquire the code information 1619 input by causing the user to input the code information 1619 using the input device 1614.

The application unit 1640 may be an application that operates in cooperation with the server apparatus 401 and manages the sheet S that is the target of the subscription contract. The application unit 1640 may be a web browser. For example, when a user account is newly registered in the server apparatus 401 and when the user account is changed, the application unit 1640 causes the display device 1615 to display an account information input screen. When the account information is input on the account information input screen, the application unit 1640 transmits the received account information to the server apparatus 401 via the communication I/F 1611. When the sheet package packaged by the wrapping paper 1618 is delivered to the user and the code information 1619 is read by the camera 1613, the application unit 1640 causes the display device 1615 to display an information input screen of the sheet S. When the information of the sheet S is input on the information input screen of the sheet S, the application unit 1640 transmits the received information of the sheet S to the server apparatus 401 via the communication I/F 1611.

The application unit 1640 may provide a user interface for concluding a subscription contract through the server apparatus 401 to a user who desires the subscription contract. The application unit 1640 may cause the display device 1615 to display a predetermined message on a scheduled delivery date. The message may include information that prompts the user to read the code information 1619. Further, the message may include information prompting the user to use the subscription target sheet S in the image forming apparatus 100 after the reading of the code information 1619 is completed.

The server apparatus 401 performs registration of the sheet S based on the unique code information 1619 given to the wrapping paper 1618 of the sheet S. Thereafter, the response receiving unit 1650 receives the registration result of the sheet S from the server apparatus 401. Note that the registration result may be directly transmitted from the server apparatus 401 to the image forming apparatus 100. In this situation, the user terminal 402 does not need to transmit the registration result to the image forming apparatus 100. The application unit 1640 causes the display device 1615 to display the registration result of the sheet S received from the server apparatus 401. If the registration result of the sheet S is successful, the application unit 1640 starts the subscription contract of the sheet S. That is, the application unit 1640 subtracts the number of remaining subscription sheets S by one each time an image is formed on a sheet S. This would inhibit erroneous subtraction of the number of remaining subscription sheets.

3. Sequence 3-1. Sequence Diagram

Figure 17:
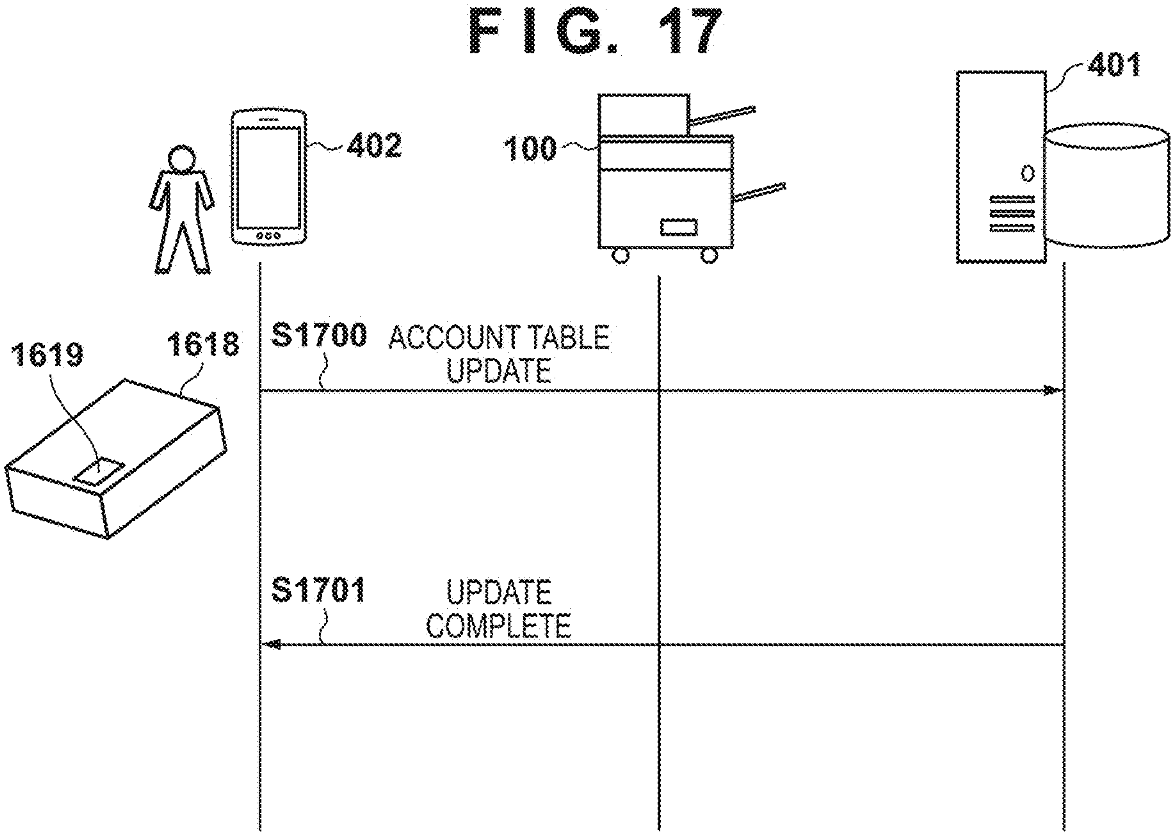
FIG. 17 is a sequence diagram showing a fourth embodiment.

FIG. 17 shows a method in which the sheet S of the subscription type is delivered to the user and the predetermined information is registered in the account table 551 using the code information 1619 of the wrapping paper 1618.

This sequence mainly involves the server apparatus 401 and the user terminal 402. Prior to the beginning of the sequence, the account information of the user and the contract information of the sheet S are registered in the account table 551 of the management database 550 in the same manner as in the third embodiment.

In S1700, the user reads the code information 1619 of the wrapping paper 1618 of the delivered subscription sheet S using the camera 1613 of the user terminal 402. When the user reads the code information 1619, the CPU 1616 (code obtaining unit 1630) obtains the code information from the camera 1613. Here, the information included in the code information 1619 is as follows. The type information is "PB". The number is "500". The user ID is "U01". The request transmitting unit 1620 transmits the code information to the server apparatus 401 via the communication I/F 1611, and makes an inquiry as to whether the subscription type and the user account are correct. The determination unit 514 of the server apparatus 401 refers to the account table 551 through the data managing unit 513 and determines whether the code itself is correct. For example, the determination unit 514 may determine whether the user ID included in the received code information is registered in the account table 551. When the code is correct, the determination unit 514 acquires, from the account table 551, type information indicating the subscription type associated with the user ID included in the received code information. The determination unit 514 determines whether the type information included in the received code information matches any type information acquired from the account table 551. When the received type information matches any of the registered type information, the data managing unit 513 adds the number information included in the received code information to the number of remaining subscription sheets in the account table 551. In the present embodiment, the received type information is "PB", the number of sheets is "500", and the user ID is "U01". In the account table 551, the number of remaining subscription sheets of the type information "PB" associated with "U01" is "50000". Therefore, "500" is added to the number of remaining subscription sheets "50000", and the number of remaining subscription sheets of the type information "PB" is updated to "50500".

In S1701, the response transmitting unit 512 notifies the user terminal 402 of the completion of updating via the communication I/F 503. The application unit 1640 causes the display device 1615 to display the received update result. Here, immediately after the subscription contract is concluded, there is no sheet S at the user's site (undelivered). Similarly, when the image forming apparatus 100 prints an image on the sheet S, the number of remaining subscription sheets may become zero. In this case, there is no sheet S at the user's site until the subscription sheet S is delivered next. Therefore, the data managing unit 513 may set the number of remaining subscription sheets to "0" at a stage when the user starts a contract or updates the contract. When the code information 1619 of the wrapping paper 1618 for the delivered sheet package is read by the camera 1613, the data managing unit 513 may add a predetermined number to the number of remaining subscription sheets. As a result, even when an image is printed on the sheet S that is not subject to the subscription contract and that is owned by the user, the number of remaining subscription sheets is not erroneously subtracted. The code information of the present embodiment is an example, and other information may be added. Since the flow of the subsequent printing is as described above, the description thereof will be omitted.

3-2. Flowchart

Figure 18:
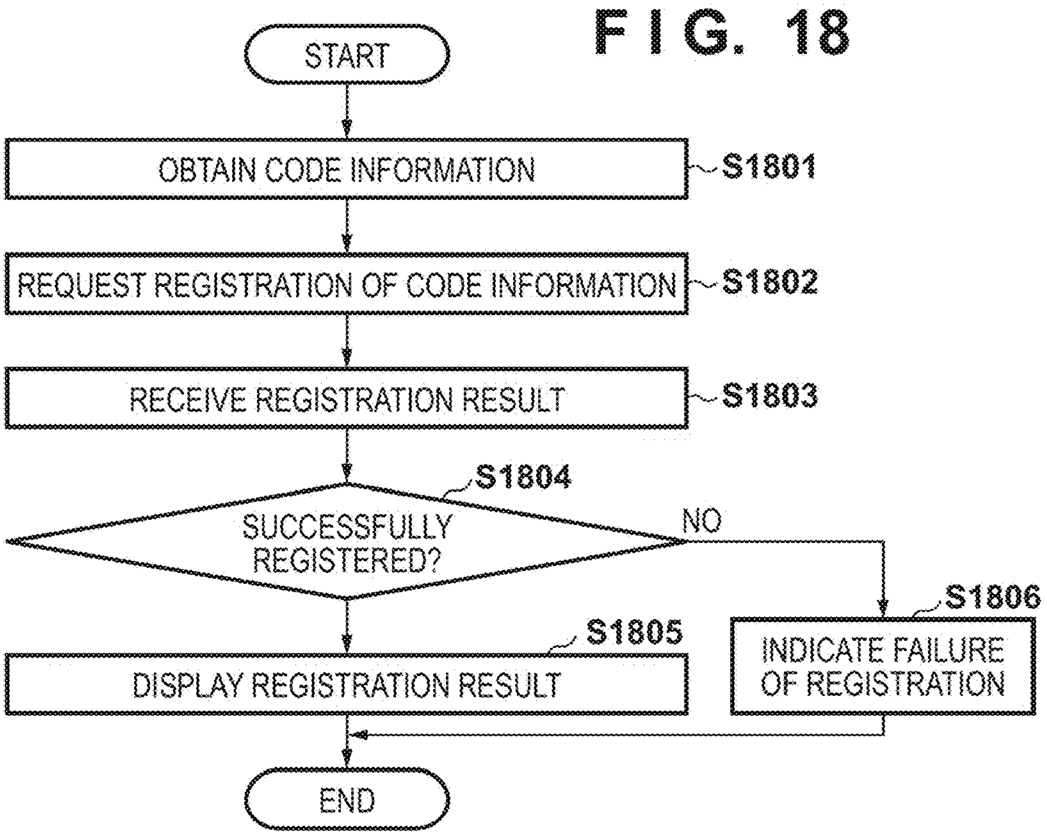
FIG. 18 is a flowchart showing how to control a user terminal.

FIG. 18 shows a control method executed by the CPU 1616 of the user terminal 402. As in the third embodiment, the server apparatus 401 registers the contract information (the control table 552) in the server apparatus 401 in advance.

In S1801, the CPU 1616 reads the code information 1619 given to the wrapping paper 1618 of the delivered sheet package by the camera 1613. That is, the code obtaining unit 1630 obtains the code information 1619 from the camera 1613.

In S1802, the CPU 1616 (request transmitting unit 1620) requests the server apparatus 401 to register the code information 1619 in the account table 551 of the user via the communication I/F 1611.

Here, the transmitted request signal includes the obtained code information 1619.

In S1803, the CPU 1616 (response receiving unit 1650) receives the result of registering the code information 1619 in the account table 551 of the user from the server apparatus 401.

In S1804, the CPU 1616 determines whether the registration of the code information 1619 is successful based on the received registration result. If the registration is successful, the CPU 1616 proceeds from S1804 to S1805. If registration is not successful, the CPU 1616 proceeds from S1804 to S1806.

In S1805, the CPU 1616 displays the registration result received from the server apparatus 401 on the display device 1615, and ends this flow chart.

In S1806, the CPU 1616 displays on the display device 1615 that the code information 1619 could not be registered. As a cause of the registration failure, the read code information 1619 itself may be incorrect. Another reason is that the user ID is not present in the account table 551, although the code information 1619 is correct. In these cases, the display device 1615 may display the cause of the error and the solution.

Figure 19:
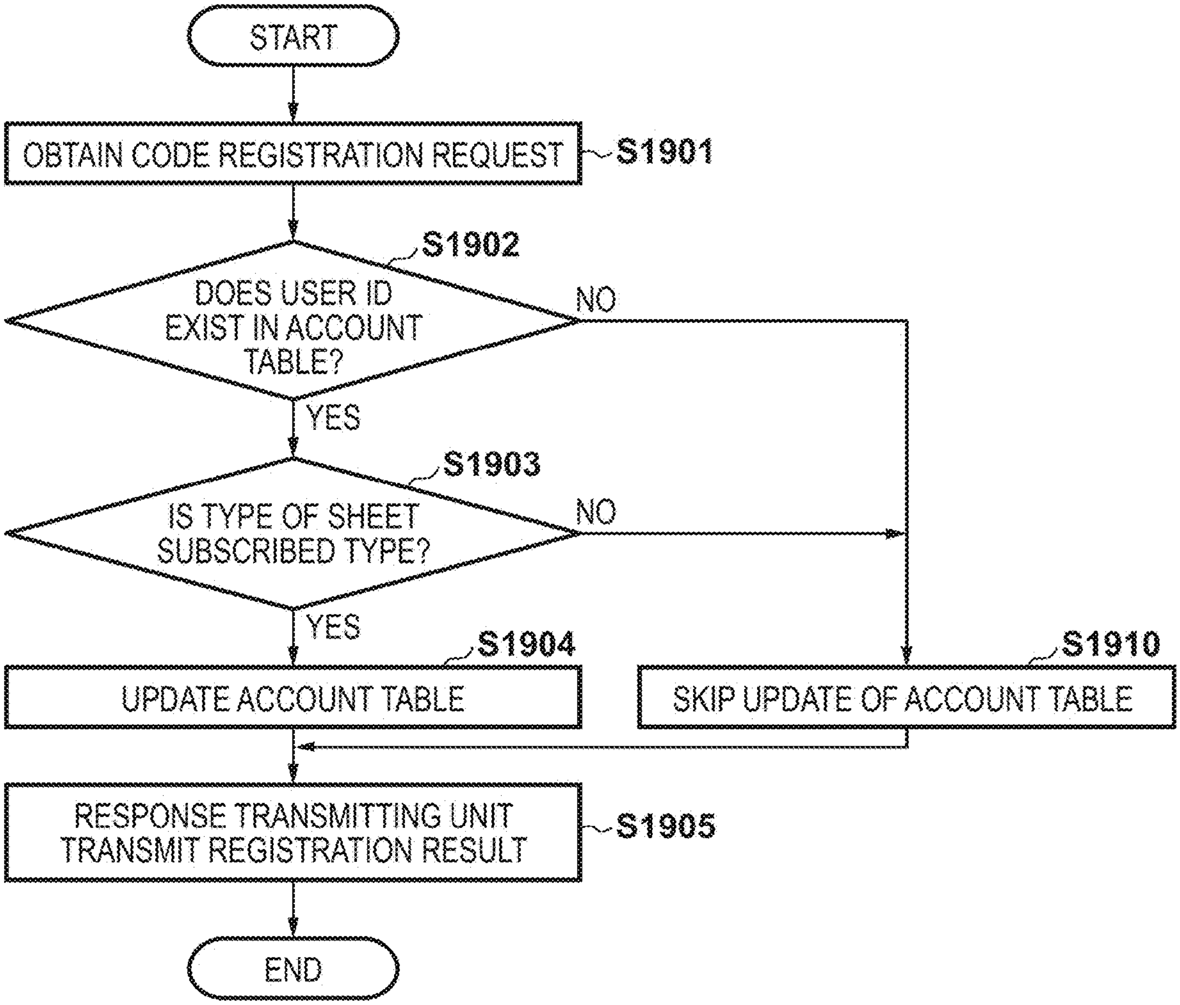
FIG. 19 is a flowchart showing how to control a server device.

FIG. 19 shows a control method executed by the CPU 501 of the server apparatus 401. As in FIG. 18, the contract information (account table 551) is registered in the server apparatus 401 in advance. Here, the account table 551 illustrated in FIG. 12 is used.

In S1901, the CPU 501 (request receiving unit 511) receives a code-registration request from the user terminal 402.

In S1902, the CPU 501 (determination unit 514) determines whether or not the user ID included in the received code information 1619 exists in the account table 551. That is, it is determined whether the received user ID matches any user ID registered in the account table 551. The user ID included in the code information 1619 is "U01". In the account table 551 shown in FIG. 12, "U01" exists. Thus, the CPU 501 proceeds from S1902 to S1903. On the other hand, when the account table 551 including "U01" is not present as the user ID, the CPU 501 proceeds from S1902 to S1910.

In S1903, the CPU 501 (determination unit 514) determines whether or not the type indicated by the type information included in the received code information 1619 is a subscription type. The data managing unit 513 refers to the account table 551 based on the "U01" included in the received code information 1619, and acquires type information indicating the type of the subscription target. Further, the data managing unit 513 determines whether the received type information matches any type information acquired from the account table 551. Here, the received type information is "PB". The type information associated with "U01" of the user ID in the account table 551 is "PB". Therefore, it is determined that the sheet S located at the user's site is the subscription sheet S. In this case, the CPU 501 then proceeds from S1903 to S1904. If the received type information does not coincide with any type information obtained from the account table 551, the CPU 501 proceeds from S1903 to S1910.

In S1904, the CPU 501 (data managing unit 513 and updating unit 531) updates the account table 551. For example, the updating unit 531 adds the number of remaining subscription sheets "500" included in the code information to the number of remaining subscription sheets "50000" associated with the type information "PB" in the account table 551. As a result, the number of remaining subscription sheets is updated to "50500".

In S1905, the CPU 501 (response transmitting unit 512) transmits the update result of the account table 551 by the updating unit 531 to the user terminal 402 via the communication I/F 503. As a result, the present flowchart ends.

In S1910, the CPU 501 (data managing unit 513 and updating unit 531) does not update the account table 551. That is, when the user ID included in the code information does not exist in the account table 551, the account table 551 is not updated. Even when the type information included in the code information 1619 does not exist in the account table 551, the account table 551 is not updated. In S1905, the CPU 501 (response transmitting unit 512) transmits the update result (e.g. update failure) of the account table 551 to the user terminal 402 via the communication I/F 503.

According to the fourth embodiment, the user can more easily start (update) the subscription contract by reading the code information 1619 of the sheet S that is the target of the subscription contract delivered to the user. As a result, the number of remaining subscription sheets will be managed more accurately.

Embodiment 5

Figure 20:
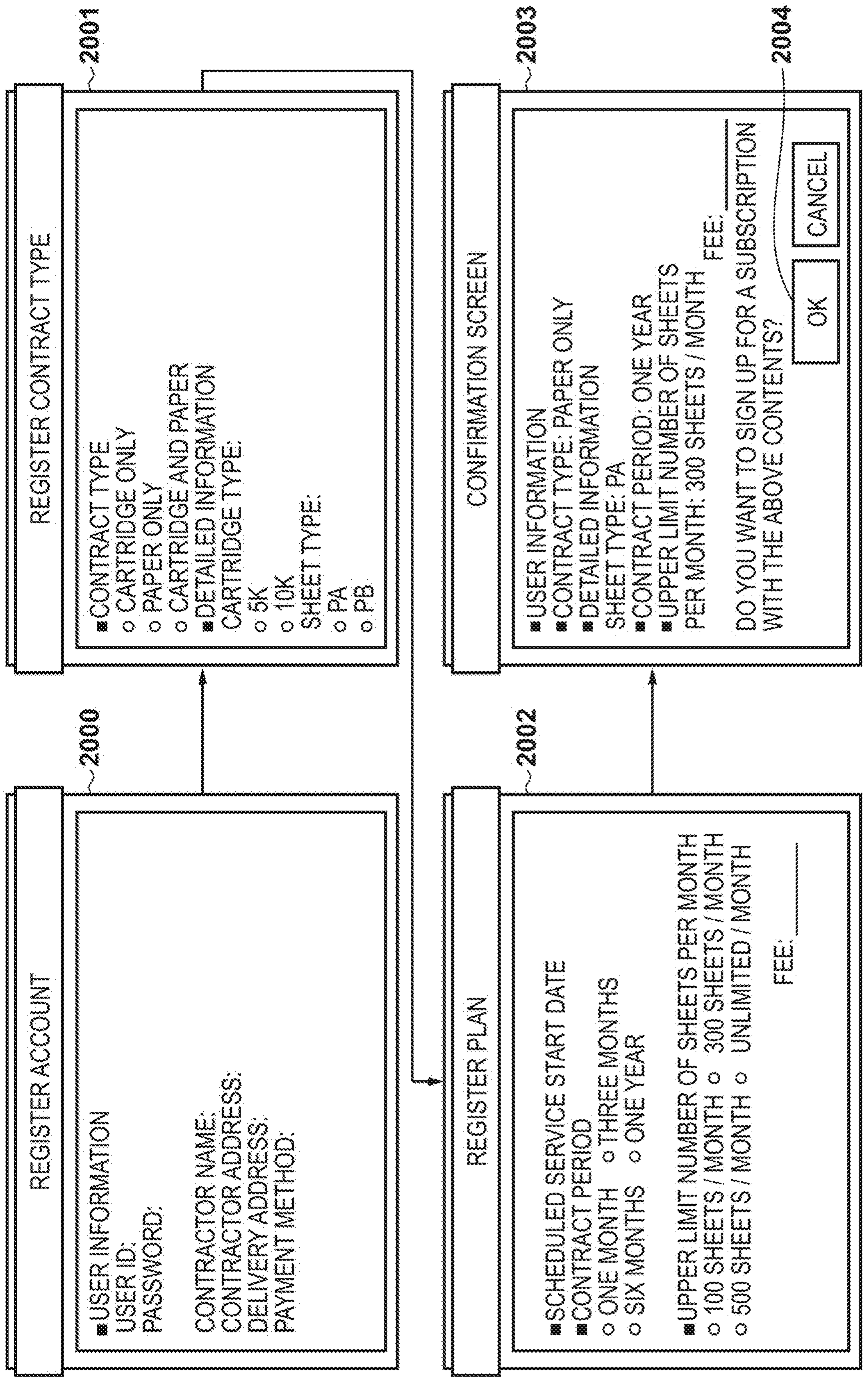
FIG. 20 is a sequence diagram showing a fifth embodiment.

FIG. 20 shows screens 2000 to 2003 involved in registration of a subscription contract displayed on the user terminal 402 by the server apparatus 401. The screens 2000 to 2003 may be, for example, web pages written in HTML (Hypertext Markup Language).

The screen 2000 is a screen displayed when the user registers an account. On the screen 2000, information of a user required for concluding a subscription contract is input. If the user ID has already been issued, input of the user ID may be omitted. If the user ID has not been issued, the issuance of the user ID may be executed simultaneously with the registration of the account. Here, the information input by the user includes "user ID", "password", "contractor name", "contractor address", "delivery address", and "payment method".

The screen 2001 is a screen displayed for the user to register a contract type. An entry is accepted for the object (target) of the subscription contract (e.g. a combination of consumables) and its details. As a contract type, "cartridge only", "paper only", and "cartridge and paper" can be selected. On the screen 2001, detailed information of the cartridge and the sheet can also be selected. In the "cartridge type", the number of sheets printable by a cartridge per cartridge (life) is selected. In the "paper type", the type information "PA" or "PB" described in FIG. 6 may be selected.

The screen 2002 is a screen for accepting registration of a plan of a subscription (service plan). Here, the input is accepted for "scheduled service start date", "contract period", and "upper limit number of sheets per month". In the "scheduled service start date", a date (scheduled date) on which the use of the consumables determined by the registration of the contract type is started is input. As described above, the scheduled date is the date on which the cartridge or the sheet S object to the subscription contract arrives at the user's site, the code information 1619 is read, and the user ID and the like are registered in the server apparatus 401. Here, an approximate scheduled date is input.

In the contract period, the contract period starting from the service start date is selected. For example, a period desired by the user is selected from "1 month", "3 months", "6 months", and "1 year". In addition, "upper limit number of sheets per month" is input. The "upper limit number of sheets per month" is the upper limit number of sheets S that can be printed an image by a user under the subscription contract per month. If the number of printed sheets exceeds the upper limit, the image forming apparatus 100 may be prohibited from further printing. If an additional fee is paid, the image forming apparatus 100 may be allowed to continue printing. For example, the upper limit number of sheets per month desired by the user is selected from "100 sheets per month", "300 sheets per month", "500 sheets per month", and "unlimited per month". The "fee" corresponding to the combination of the selected "contract period" and the "upper limit number of sheets per month" may be displayed so that the user can easily specify the "contract period" and the "upper limit number of sheets per month".

The screen 2003 is a screen for displaying at least a part of the contents of the subscription contract determined by the user from the screen 2000 through the screen 2002. The user confirms contents of the contract through the screen 2003 and depresses OK button 2004 to conclude the subscription contract.

The content described here is merely an example. Information that can be input by the user through the screens 2000 to 2003, an input procedure of information, a type of information, a module used for inputting information, units of information, numerical values, and the like are optional.

According to the fifth embodiment, a screen 2000 for registering an account, a screen 2001 for registering a contract type, a screen 2002 for registering a plan, and a screen 2003 for confirming contract contents are displayed on the user terminal 402. Accordingly, the user can easily apply for and update the subscription contract.

Embodiment 6

Figure 21A:
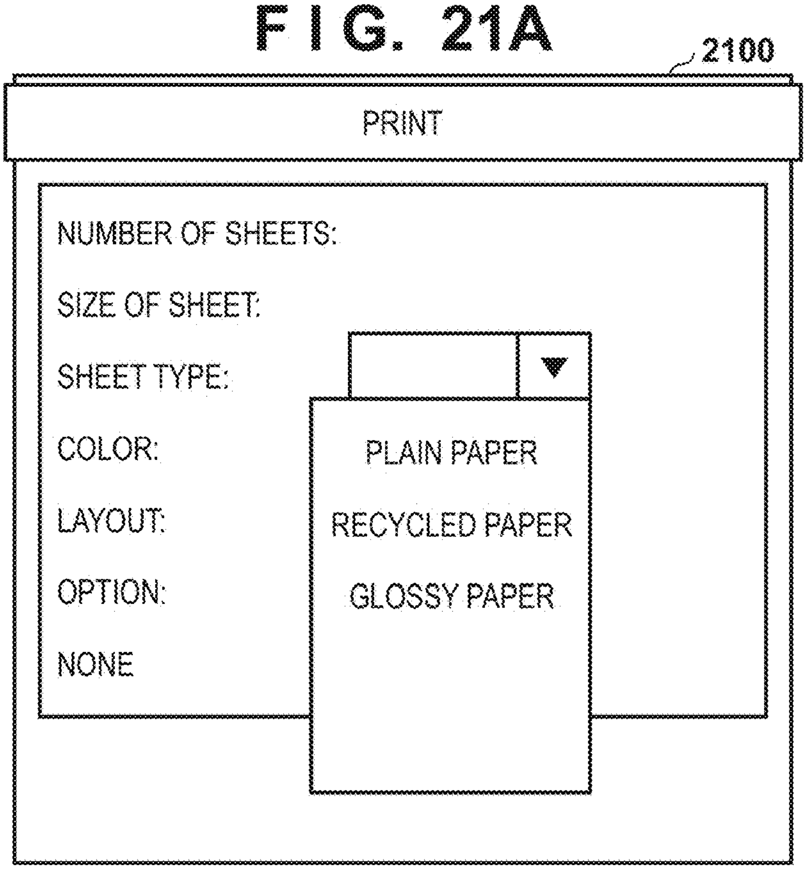
FIGS. 21A and 21B are diagrams illustrating a print instruction screen according to a sixth embodiment.

FIG. 21A shows a print instruction screen 2100 displayed on the user terminal 402 of the user without the subscription contract.

In the print instruction screen 2100, items to be determined by the user include "number of sheets", "paper size", "paper type", "color", "layout", and "optional". The "number of sheets" is the number of sheets S on which an image is printed. The "paper size" is the size of the sheet S on which an image is printed. The "sheet type" indicates type information such as plain paper, recycled paper, glossy paper, and the sheet S object to subscription contract. The "color" indicates monochrome printing or color printing. The "layout" indicates single-sided printing, double-sided printing, and the number of pages per sheet. The "option" is an arbitrary print setting that is necessary depending on a paper type, an image to be printed, or the like. The user decides these settings by himself/herself and performs printing. There may be default settings for each item.

In this case, if the user does not select any settings, printing is performed with the default settings.

Figure 21B:
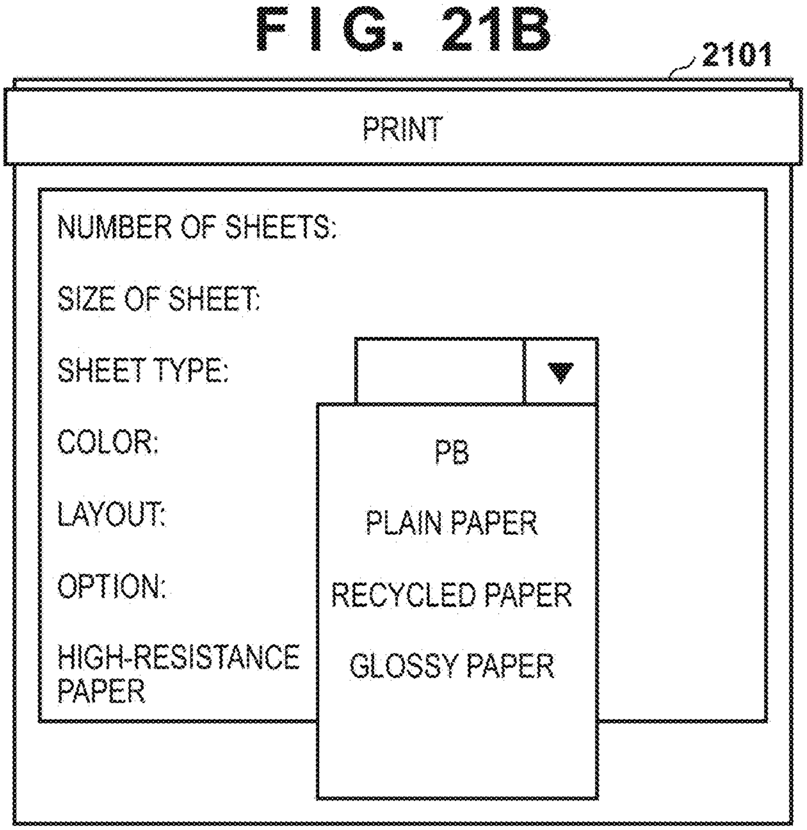

FIG. 21B shows a print instruction screen 2101 displayed on the user terminal 402 of the user with the subscription contract. In the print instruction screen 2101, the description of the matters common to the print instruction screen 2100 has already been described, and thus the description thereof will be omitted. In the print instruction screen 2101 for the user with the subscription contract, a list including the sheet types object to the subscription contract is displayed in the "sheet type". Here, "PB", which is the type information added in the fourth embodiment, is included in the list. Here, when "PB" is selected, an option suitable for printing "PB" may be automatically selected. If "PB" is a special paper called high-resistance paper, the option "high-resistance paper" is automatically set. In the print instruction screen 2100 for the user without the subscription contract, it is necessary for the user to make an optional print setting as necessary, based on the user considering an image or the like. However, in the print instruction screen 2101 for the use with the subscription contract, the option is automatically set according to the selected paper type (sheet type). For example, the specific contents of the "option" may be associated with the type information of the account table 551. As a result, the "option" associated with the sheet type may be automatically set. That is, the control determination unit 515 creates an image forming condition to which the optional print setting associated with the sheet type is applied, creates a response signal including the image forming condition, and transmits the response signal to the image forming apparatus 100.

As described above, the "option" may be automatically set so that more appropriate print control can be executed without depending on the decision of the user. In the first to third embodiments, a method of changing the optimum control by the control table 552 has been described. Changing of control may be implemented depending on the settings of the options.

When there is a change in the content of the subscription contract, the content displayed on the display device 1615 by the application unit 1640 of the user terminal 402 may be updated as necessary. For example, the display content may be updated at the timing when the update completion of the account table 551 is notified to the user terminal 402 of the fourth embodiment.

Upon receiving the update completion notification of the account table 551, the response receiving unit 1650 stores the updated contents of the account table 551 of the user transmitted from the server apparatus 401 in the memory 1612. The application unit 1640 updates the print instruction screen 2101 with the subscription contract based on the content stored in the memory 1612, and causes the display device 1615 to display the updated print instruction screen 2101.

The print instruction screen 2101 may be updated based on the information in the account table 551. The print instruction screen 2100 or the print instruction screen 2101 is provided according to the presence or absence of a subscription contract.

Technical Ideas Derived from Embodiments

Item 1

The selection unit 312 and the CPU 301 are examples of a first processor that selects the first image forming condition according to a type of a sheet.

The request transmitting unit 311 and the communication circuit 303 are examples of a first transmitting circuit that transmits a request signal including type information indicating the type of the sheet to a server apparatus. The response receiving unit 313 and the communication circuit 303 are examples of a first receiving circuit that receives a response signal corresponding to a request signal. The rotary main body 9 and the control unit 316 are examples of an image forming unit that forms an image on a sheet.

The request receiving unit 511 and the communication I/F 503 are examples of a second receiving circuit that receives a request signal from the image forming apparatus. The determination unit 514 and the CPU 501 are examples of a second processor that determines whether the type of the sheet based on the request signal is the same as a particular type, which is the type of the sheet delivered from the service provider to the user according to the subscription contract. The CPU 501, the control determination unit 515, and the communication I/F 503 are examples of a second transmitting circuit that, when the type of the sheet based on the request signal is the same as the particular type, generates a response signal specifying that an image is to be formed by a second image forming condition prepared in advance for the particular type, and transmits the response signal to the image forming apparatus. The image forming unit forms an image on the sheet according to the first image forming condition or the second image forming condition based on the response signal.

If the user has a subscription for a consumable subscription service, the type of sheet S has been known to a subscription service operator/provider. In addition, the type of the sheet S may be known to the server apparatus 401. In such cases, the server apparatus 401 may cause the image forming apparatus 100 to use an image forming condition prepared in advance for a particular type.

Item 2

If the type of the sheet S is not the particular type, the image forming apparatus 100 itself determines an image forming condition. This will allow the image forming apparatus to use the appropriate image forming condition according to the sheet type.

Item 3

The memory 502 and the management database 550 are examples of a memory that stores type information indicating a particular type and a second image forming condition associated with the type information. In this way, the server apparatus 401 may hold a database of an image forming condition corresponding to a particular type. Accordingly, even if a plurality of types of sheets S are delivered through the subscription service, an appropriate image forming condition can be provided for each type.

Item 4

As illustrated in FIG. 6 and the like, the account table 551 may store the user ID and the type information in association with each other. To this end, it would be possible to quickly and accurately identify the type of sheets for which each user has a subscription.

Item 5

Instead of the user ID, unique identification information of the image forming apparatus 100 (e.g. a manufacturing serial number or the like) may be registered in the account table 551. Alternatively, unique identity information for each contract, such as a contract number, may be employed in place of the user ID.

Items 6 to 8

The operation unit 30 and the communication circuit 303 are examples of an input device that receives type information indicating a type of a sheet designated by a user. In this way, the type information may be provided by the user. The communication circuit 303 may be configured to receive type information transmitted from a user's wireless communication terminal (e.g. the user terminal 402). The radio communication terminal may be a wired communication terminal such as a personal computer (PC).

Item 9

The sheet cassette 8 is an example of a stacking tray for accommodating sheets. The feed roller 11 is an example of a conveyance roller that conveys the sheet stacked on the stacking tray to the image forming unit. The medium sensor 25 is an example of a sensor that detects the type of the sheet. In this way, the type information may be acquired by the sensor.

Item 10

The notification unit 332 and the communication circuit 303 may notify the server apparatus of the acquired number of sheets. The CPU 501 and the account table 551 may monitor the number of remaining sheets delivered from the service provider to the user according to the subscription contract based on the notified number of sheets. As described in the third embodiment, the image forming condition may be determined considering the number of remaining subscription sheets. There is a case where the user erroneously inputs the type information of the subscription target due to a mistake and the sheets S of the subscription target have been already run out. Even in such cases, an appropriate image forming condition may be set according to the current state of the image forming apparatus 100.

Item 11

As described in the fourth embodiment, the timing at which the server apparatus 401 and the image forming apparatus 100 start subtracting the number of remaining sheets S may be the timing at which the delivery of the sheets S has been completed. This would inhibit erroneous subtraction. Note that the timing at which the delivery of the sheets S is completed may be a timing at which the code information 1619 read by the camera 1613 is registered in the server apparatus 401.

Item 12

As described in the fourth embodiment, the CPU 501 may receive, from the user terminal 402, a reading result of the code information 1619 attached to the sheet package. Then, when the received code information 1619 (e.g. user ID, type information) matches the code information registered in the account table 551, subtraction of the number of remaining sheets S may be started. This would inhibit erroneous subtraction.

Item 13

The camera 1613 of the user terminal 402 is an example of an image sensor or a code reader that reads code information given to a sheet package (e.g. wrapping paper 1618) delivered to the user. The request transmitting unit 1620 is an example of a request transmitting circuit that transmits a request signal for registering the code information read by the image sensor in the server apparatus. The request receiving unit 511 is an example of a request receiving circuit that receives a request signal from a terminal device. The data managing unit 513 is an example of a processor that determines whether the code information included in the request signal is correct code information. As described in the fourth embodiment, when the code information 1619 included in the request signal is the correct code information registered in the account table 551, subtraction of the number of remaining sheets S may be started. This would inhibit erroneous subtraction.

Item 14

As described in the fifth embodiment, the screen 2001 and the screen 2002 may be provided so that the user can more easily select a service plan (service item).

Item 15

The display device 1615 is an example of a display that displays a screen (for example, a print instruction screen 2101) that accepts selection of a sheet type and selection of an optional print setting to be applied to the sheet. As described above, the optional print setting may be associated with the sheet S of the particular type that is the target (object) of the subscription contract. This would allow the user to automatically set print settings appropriate for a particular type without manually selecting optional print settings.

Item 16

The first image forming condition and the second image forming condition include at least one of a throughput that is the number of sheets to be formed in a unit of time in the image forming apparatus, a conveying speed of the sheet, a fixing temperature of the fixing device, a charging voltage, a developing voltage, a primary transfer voltage, and a secondary transfer voltage.

Item 17

As described in the second embodiment, the second type information of the sheet S delivered from the service provider to the user according to the subscription contract and the second image forming condition for the second type information may be registered from the server apparatus 401 to the image forming apparatus 100. If the type of the sheet S is the subscription type, the image forming apparatus 100 adopts the second image forming condition. If the type of the sheet S is not the subscription type, the image forming apparatus 100 adopts the first image forming condition. This would allow the image forming apparatus 100 to use the appropriate image forming condition according to the sheet type.

Item 18

As described at the end of the third embodiment, the second embodiment and the third embodiment may be combined. That is, the CPU 301 may determine an image forming condition considering the number of remaining subscription sheets.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-153905, filed Sep. 20, 2023 and Japanese Patent Application No. 2024-085657, filed May 27, 2024 which are hereby incorporated by reference herein in their entirety.

What is claimed is:

1. An image forming system comprising:

an image forming apparatus configured to form an image on a sheet; and a server apparatus configured to connect to the image forming apparatus via a network, wherein the image forming apparatus comprises:

a first processor configured to:

select a first image forming condition according to a type of the sheet;

transmit a request signal including type information indicating the type of the sheet to the server apparatus; and receive a response signal corresponding to the request signal; and an image forming unit configured to form the image on the sheet, and wherein the server apparatus comprises a second processor configured to:

receive the request signal from the image forming apparatus;

determine whether the type of the sheet based on the request signal is the same as a particular type which is a type of a sheet delivered from a service provider to a user through a subscription contract; and in a case where the type of the sheet based on the request signal is the same as the particular type, generate the response signal specifying to perform image formation with a second image forming condition prepared in advance for the particular type; and transmit the response signal to image forming apparatus, and wherein the image forming unit is further configured to form the image on the sheet according to the first image forming condition or the second image forming condition based on the response signal.

2. The image forming system according to claim 1, wherein in a case where the type of the sheet based on the request signal is not the same as the particular type, the second processor generates the response signal specifying that the first image forming condition is used to perform the image formation, and transmits the response signal to the image forming apparatus.

3. The image forming system according to claim 1, wherein the server apparatus further comprises a memory configured to store the type information indicating the particular type and the second image forming condition associated with the type information, and the second processor is further configured to:

determine whether the type information included in the request signal matches the type information stored in the memory; and in a case where the type information included in the request signal matches the type information stored in the memory, read out the second image forming condition corresponding to the type information included in the request signal from the memory, and transmit the second image forming condition to the image forming apparatus through the response signal.

4. The image forming system according to claim 3, wherein the memory is further configured to store type information indicating the particular type in association with identification information of the user.

5. The image forming system according to claim 3, wherein the memory is further configured to store type information indicating the particular type in association with identification information of the image forming apparatus.

6. The image forming system according to claim 1, wherein the image forming apparatus further comprises an input device configured to receive the type information indicating the type of the sheet specified by the user, and wherein the first processor is further configured to transmit the type information received by the input device to the server apparatus in the request signal.

7. The image forming system according to claim 6, wherein the input device is further configured to receive an input operation of the user.

8. The image forming system according to claim 6, wherein the input device is further configured to receive the type information transmitted from a wireless communication terminal of the user.

9. The image forming system according to claim 1, wherein the image forming apparatus further comprises:

a stacking tray configured to accommodate the sheet;

a conveyance roller configured to convey the sheet stacked on the stacking tray to the image forming unit; and a sensor configured to detecting a type of the sheet, and wherein the first processor is further configured to transmit the type information indicating the type detected by the sensor to the server apparatus in the request signal.

10. The image forming system according to claim 1, wherein the image forming apparatus further comprises:

a stacking tray configured to accommodate the sheet; and a conveyance roller configured to convey the sheet stacked on the stacking tray to the image forming unit, and wherein the first processor is further configured to:

obtain a number of sheets on which an image is formed by the image forming unit;

notify the number of sheets obtained by the first processor to the server apparatus; and transmit the type information indicating the type of the sheet stacked on the stacking tray to the server apparatus in the request signal, and wherein the second processor is further configured to:

based on the number of sheets notified by the first processor, monitor the number of remaining sheets delivered from the service provider to the user according to the subscription contract;

in a case where the type of the sheet based on the request signal is the same as the particular type and a number of remaining sheets exceeds a threshold value, generate the response signal specifying that the second image forming condition is used; and in a case where the type of the sheet based on the request signal is the same as the particular type and the number of the remaining sheets is equal to or less than the threshold value, generate the response signal specifying that the first image forming condition is used, and transmit the response signal to image forming apparatus.

11. The image forming system according to claim 10, wherein the second processor is further configured to initiate subtraction of the number of the remaining sheets upon completion of delivery of the particular type of sheets to the user.

12. The image forming system according to claim 10, wherein the second processor is further configured to receive, from the user, a reading result of code information given to a sheet package delivered to the user, and initiate subtracting the number of the remaining sheets in a case where the code information included in the reading result matches the code information associated with the user.

13. The image forming system according to claim 12, wherein a terminal device of the user comprises:

an image sensor configured to read the code information given to the sheet package delivered to the user; and a transmitting circuit configured to transmit a request signal for registering the code information read by the image sensor to the server apparatus, and wherein the second processor of the server apparatus is further configured to:

receive the request signal from the terminal device;

determine whether the code information included in the request signal is correct code information; and in a case where the code information included in the request signal is the correct code information, initiate subtraction of the number of the remaining sheets.

14. The image forming system according to claim 1, wherein the second processor of the server apparatus is further configured to provide, to the user, a screen for accepting a selection of a service plan including a combination of consumables object to the subscription contract, and accept a selection of the service plan through the screen.

15. The image forming system according to claim 1 wherein a terminal device of the user further comprises a display for displaying a screen for accepting selection of a type of a sheet and selection of an optional print setting applied to the sheet, and wherein the second processor of the server apparatus is further configured to include, in the second image forming condition, the optional print settings associated with the particular type when the particular type is selected through the screen.

16. The image forming system according to claim 1 wherein the image forming unit further comprises:

a conveyance roller configured to convey the sheet;

a photosensitive body;

a charging member configured to charge a surface of the photosensitive body using a charging voltage;

an exposure light source configured to form an electrostatic latent image by exposing a surface of the photosensitive body;

a developing member configured to develop the electrostatic latent image with toner and a developing voltage to form a toner image;

a primary transfer member configured to transfer the toner image from the photosensitive body to an intermediate transfer body using a primary transfer voltage;

a secondary transfer member configured to transfer the toner image from the intermediate transfer body to the sheet using a secondary transfer voltage; and a fixing device configured to fix the toner image on the sheet, and wherein the first image forming condition and the second image forming condition comprise at least one of:

a throughput which is a number of sheets to be formed with an image per unit time in the image forming apparatus;

a conveying speed of the sheet;

a fixing temperature of the fixing device;

the charging voltage;

the developing voltage;

the primary transfer voltage; and the secondary transfer voltage.

17. A server apparatus connected to an image forming apparatus configured to form an image on a sheet through a network, the image forming apparatus configured to select a first image forming condition corresponding to a type of the sheet, transmit a request signal including type information indicating the type of the sheet to the server apparatus, receive a response signal corresponding to the request signal, and form the image on the sheet based on the response signal, the server apparatus comprising a processor configured to:

receive the request signal from the image forming apparatus;

determine whether the type of the sheet based on the request signal is the same as a particular type which is a type of a sheet delivered to a user from a service provider through a subscription contract; and in a case where the type of the sheet based on the request signal is the same as the particular type, generate the response signal specifying that the image is formed with a second image forming condition prepared in advance for the particular type, and transmit the response signal to image forming apparatus, and wherein the image forming apparatus is further configured to form the image on the sheet according to the first image forming condition or the second image forming condition based on the response signal.

18. An image forming apparatus configured to connect to a server apparatus via a network, the image forming apparatus comprising:

a processor configured to:

select a first image forming condition according to a type of sheet;

transmit a request signal including type information indicating the type of the sheet the server apparatus; and receive a response signal corresponding to the request signal; and an image forming unit configured to form an image on the sheet, wherein the server apparatus is further configured to receive the request signal from the image forming apparatus, determine whether the type of the sheet based on the request signal is the same as a particular type that is a type of a sheet delivered from a service provider to a user through a subscription contract, and in a case where the type of the sheet based on the request signal is the same as the particular type, generate the response signal specifying that the image is formed with a second image forming condition prepared in advance for the particular type, and transmit the response signal to the image forming apparatus, and the image forming unit is further configured to form the image on the sheet according to the first image forming condition or the second image forming condition based on the response signal.

19. An image forming system comprising:

an image forming apparatus configured to form an image on a sheet; and a server apparatus configured to connect to the image forming apparatus via a network, wherein the server apparatus comprises a first processor configured to register, in the image forming apparatus, second type information indicating a type of a sheet delivered from a service provider to a user through a subscription contract to the image forming apparatus and a second image forming condition associated with the second type information, the image forming apparatus further comprises:

a memory configured to store the second type information and the second image forming condition registered by the first processor;

a stacking tray configured to accommodate sheets;

an image forming unit configured to form an image on the sheet; and a second processor configured to obtain a first type information indicating the type of the sheet stacked on the stacking tray, and determine a first image forming condition corresponding to the first type information, and the image forming unit is further configured to form the image on the sheet using the second image forming condition stored in the memory in a case where the first type information and the second type information coincide with each other.

20. The image forming system according to claim 19, wherein the image forming apparatus further comprises an input device configured to receive the first type information indicating a type of the sheet designated by a user.

21. The image forming system according to claim 20, wherein the input device is further configured to receive an input operation of the user.

22. The image forming system according to claim 20, wherein the input device is further configured to receive the first type information transmitted from a communication terminal of the user.

23. The image forming system according to claim 19, wherein the second processor is connected to a sensor for detecting the type of the sheet, and the first type information indicates a type of the sheet detected by the sensor.

24. The image forming system according to claim 19, wherein the second processor is further configured to monitor the number of remaining sheets delivered from the service provider to the user according to the subscription contract based on a number of sheets on which an image is formed by the image forming unit, and the image forming unit is configured to:

use the second image forming condition in a case where the first type information and the second type information are the same and the number of the remaining sheets exceeds a threshold value; and use the first image forming condition in a case where the first type information and the second type information are the same and the number of the remaining sheets is equal to or less than the threshold value.

25. A server apparatus connected via a network to an image forming apparatus for forming an image on a sheet, the server apparatus comprising a first processor configured to register, in the image forming apparatus, second type information indicating a type of a sheet delivered from a service provider to a user through a subscription contract for the image forming apparatus and a second image forming condition associated with the second type information, and wherein the image forming apparatus further comprises:

a memory configured to store the second type information and the second image forming condition registered by the first processor;

a stacking tray configured to accommodate sheets;

an image forming unit configured to form an image on the sheet; and a second processor configured to obtain a first type information indicating a type of the sheet stacked on the stacking tray, and determine a first image forming condition corresponding to the first type information, and wherein the image forming unit is further configured to form an image on the sheet using the second image forming condition stored in the memory in a case where the first type information and the second type information coincide with each other.

26. An image forming apparatus configured to connect to a server apparatus via a network and form an image on a sheet, the server apparatus configured to register, in the image forming apparatus, second type information indicating a type of a sheet delivered from a service provider to a user through a subscription contract for the image forming apparatus and a second image forming condition associated with the second type information, the image forming apparatus comprising:

a memory configure to store the second type information and the second image forming condition registered by the aforementioned server apparatus;

a stacking tray configured to accommodate sheets;

an image forming unit configured to form an image on the sheet; and a processor configured to obtain first type information indicating the type of the sheet stacked on the stacking tray, and determine a first image forming condition corresponding to the first type information, and wherein the image forming units is further configured to form the image on the sheet using the second image forming condition stored in the memory in a case where the first type information and the second type information coincide with each other.

* * * * *